United States Patent
Khude et al.

(10) Patent No.: US 12,550,148 B2
(45) Date of Patent: *Feb. 10, 2026

(54) APPARATUS AND METHOD FOR SCHEDULING DELAYED ACKS/NACKS IN LTE CELLULAR SYSTEMS

(71) Applicant: QUALCOMM Incorporated, San Diego, CA (US)

(72) Inventors: Nilesh Khude, Pune (IN); Libin Jiang, Seattle, WA (US); Saurabha Tavildar, San Francisco, CA (US); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 261 days.

This patent is subject to a terminal disclaimer.

(21) Appl. No.: 16/847,604

(22) Filed: Apr. 13, 2020

(65) Prior Publication Data

US 2020/0245306 A1 Jul. 30, 2020

Related U.S. Application Data

(63) Continuation of application No. 13/844,864, filed on Mar. 16, 2013, now Pat. No. 10,624,075.

(51) Int. Cl.
*H04W 72/04* (2023.01)
*H04L 1/18* (2023.01)
(Continued)

(52) U.S. Cl.
CPC ........... *H04W 72/23* (2023.01); *H04L 1/1861* (2013.01); *H04L 5/0055* (2013.01)

(58) Field of Classification Search
CPC .. H04W 72/042; H04W 72/23; H04L 1/1861; H04L 5/0055
See application file for complete search history.

(56) References Cited

U.S. PATENT DOCUMENTS 9,204,429 B2 * 12/2015 Park ................. H04L 1/1896
2010/0174962 A1 7/2010 Zheng
(Continued)

FOREIGN PATENT DOCUMENTS

CN 201967138 U 9/2011
JP 2011529318 A 12/2011
(Continued)

OTHER PUBLICATIONS

3GPP TSG RAN WG1 meeting #72 agenda 7.3.3.3. ZTE (Year: 2013).*

(Continued)

*Primary Examiner* — Walli Z Butt
*Assistant Examiner* — Thad N Defauw
(74) *Attorney, Agent, or Firm* — Procopio, Cory, Hargreaves & Savitch LLP

(57) ABSTRACT

A method, an apparatus, and a computer program product for wireless communication are provided. The apparatus may be an eNB. The eNB informs UE(s) of a change in at least one of a first configuration for transmission of ACKs/NACKs by the UE(s) for DL transmissions received by the UE(s) or a second configuration for reception of ACKs/NACKs by the UE(s) for UL transmissions sent by the UE(s). The eNB indicates to the UE(s) one or more resources in which the UE(s) is to transmit the ACKs/NACKs for the received DL transmissions or is to receive the ACKs/NACKs for sent UL transmissions. The eNB indicates to the UE(s) a subset of the DL transmissions to the UE(s) for which the UE(s) is to transmit the ACKs/NACKs or a subset of the UL transmissions by the UE(s) for which the UE(s) is to receive the ACKs/NACKs.

27 Claims, 22 Drawing Sheets

(51) Int. Cl.
*H04L 1/1829* (2023.01)
*H04L 5/00* (2006.01)
*H04W 72/23* (2023.01)

(56) References Cited

U.S. PATENT DOCUMENTS

| | | | |
|---|---|---|---|
| 2010/0329197 A1* | 12/2010 | Boariu | H04W 72/542 370/329 |
| 2011/0002309 A1 | 1/2011 | Park et al. | |
| 2011/0134774 A1 | 6/2011 | Pelletier et al. | |
| 2011/0194518 A1* | 8/2011 | Wu | H04L 1/0026 370/329 |
| 2011/0243066 A1 | 10/2011 | Nayeb Nazar et al. | |
| 2011/0310784 A1* | 12/2011 | Park | H04L 1/1896 370/312 |
| 2011/0310809 A1* | 12/2011 | Nishio | H04L 1/1861 370/329 |
| 2012/0002593 A1 | 1/2012 | Kim et al. | |
| 2012/0099491 A1 | 4/2012 | Lee et al. | |
| 2012/0113831 A1 | 5/2012 | Pelletier et al. | |
| 2012/0257554 A1 | 10/2012 | Kim et al. | |
| 2012/0307755 A1* | 12/2012 | Kim | H04L 1/1825 370/329 |
| 2012/0320805 A1 | 12/2012 | Yang et al. | |
| 2013/0279481 A1 | 10/2013 | Horiuchi et al. | |
| 2013/0294242 A1* | 11/2013 | Zhao | H04W 72/1252 370/235 |
| 2013/0336299 A1 | 12/2013 | Lee et al. | |
| 2014/0036889 A1* | 2/2014 | Kim | H04W 72/0446 370/336 |
| 2014/0064109 A1* | 3/2014 | Krishnamurthy | H04B 7/0456 370/252 |
| 2014/0086112 A1* | 3/2014 | Stern-Berkowitz | H04L 1/1854 370/280 |
| 2014/0098780 A1* | 4/2014 | Kim | H04W 72/0413 370/329 |
| 2014/0211747 A1* | 7/2014 | Takeda | H04L 1/1861 370/329 |
| 2014/0226581 A1 | 8/2014 | Nam et al. | |
| 2014/0254412 A1 | 9/2014 | Siomina | |
| 2014/0269541 A1 | 9/2014 | Khude et al. | |
| 2014/0355493 A1 | 12/2014 | Niu et al. | |
| 2015/0003347 A1* | 1/2015 | Ko | H04L 1/0026 370/329 |
| 2015/0098453 A1 | 4/2015 | Han et al. | |
| 2016/0218837 A1 | 7/2016 | Svedman et al. | |

FOREIGN PATENT DOCUMENTS

| | | |
|---|---|---|
| WO | 2011063244 A2 | 5/2011 |
| WO | 2012142973 A1 | 10/2012 |
| WO | 2012149675 A1 | 11/2012 |
| WO | 2013021569 A1 | 2/2013 |
| WO | 2014049169 A1 | 4/2014 |

OTHER PUBLICATIONS

3GPP TSG RAN meeting #68, , LS on 3GPP RAN Workshop on Licensed-Assisted Access (LAA), RP-151095, Malmo, Sweden, Jun. 15-18, 2015, 1 Page.

Alcatel-Lucent Shanghai Bell, et al., "Discussion on HARQ and UL-Grant Timing with Dynamic TDD UL-DL Configuration", 3GPP TSG RAN WG1 Meeting #68bis, 3GPP Draft; R1-121260, 3rd Generation Partnership Project (3GPP), Mobile Competence Centre; 650, Route Des Lucioles; F-06921 Sophia-Antipolis Cedex; France, vol. RAN WG1, No. Jeju, Korea; Mar. 26, 2012-Mar. 30, 2012, Mar. 20, 2012 (Mar. 20, 2012), pp. 1-6, XP050599549 (Retrieved on Mar. 20, 2012].

Ericsson: "Combination of ACK/NACKs for TDD" 3GPP Draft; R1-080870, 3rd Generation Partnership Project (3GPP), Mobile Competence Centre; 650, Route Des Lucioles; F-06921 Sophia-Antipolis Cedex; France, vol. RAN WG1, No. Sorrento, Italy; Feb. 6, 2008, Feb. 6, 2008 (Feb. 6, 2008), XP050109347, 2 pages.

Huawei: "Methods to Support Different Time Scales for TDD UL-DL Reconfiguration", 3GPP TSG RAN WG1 Meeting #69, 3GPP draft, R1-122909, 3rd Generation Partnership Project (3GPP), Mobile Competence Centre, 650, Route Des Lucioles, F-06921 Sophia-Antipolis Cedex, France, vol. RAN WG1, No. Prague, Czech Republic, May 21, 2012-May 25, 2012, May 25, 2012 (May 25, 2012), pp. 1-4, XP050601178, [retrieved on May 25, 2012] the whole document.

International Search Report and Written Opinion—PCT/US2014/024888—ISA/EPO—Jun. 24, 2014.

LG Electronics: "Variable Configuration Sizes of PUCCH and its Impact on UL ACK/NACK Mapping Relations", 3GPP Draft; R1-074737 UL ACKNACK, 3rd Generation Partnership Project (3GPP), Mobile Competence Centre; 650, Route Des Lucioles; F-06921 Sophia-Antipolis Cedex; France, vol. RAN WG1, No. Korea; Oct. 31, 2007, Oct. 31, 2007 (Oct. 31, 2007), XP050108211,pp. 4 [retrieved on Oct. 31, 2007].

ZTE: "HARQ timing in TDD-eIMTA", 3GPP TSG RAN WG1 Meeting #72, R1-130130, 3GPP Server Publication, Jan. 19, 2013, pp. 1-3.

* cited by examiner

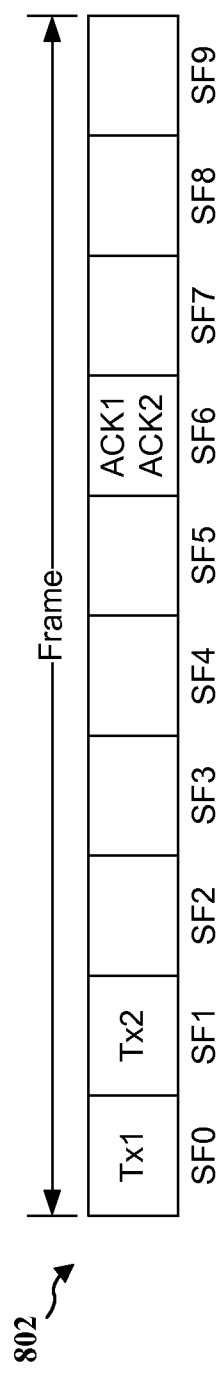
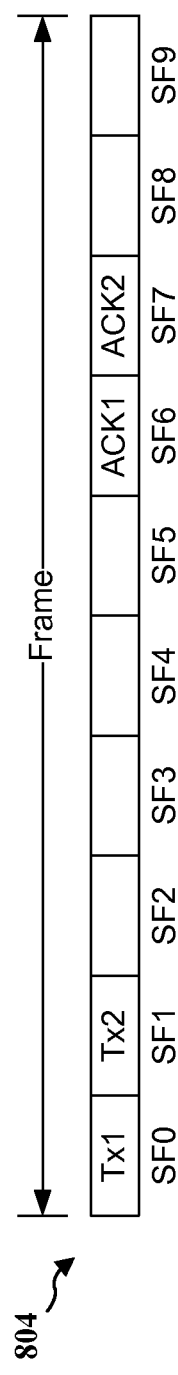
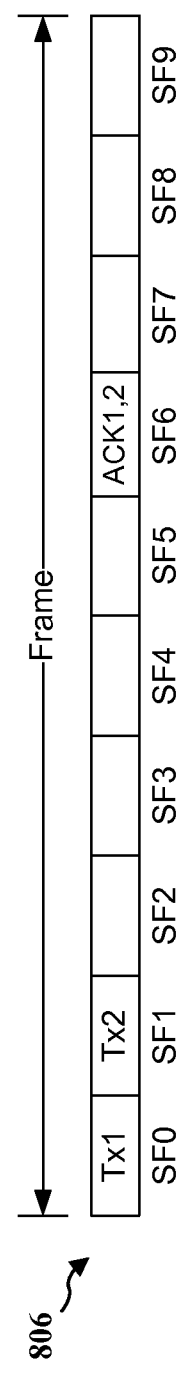
FIG. 8A
FIG. 8B
FIG. 8C

APPARATUS AND METHOD FOR SCHEDULING DELAYED ACKS/NACKS IN LTE CELLULAR SYSTEMS

CROSS-REFERENCE TO RELATED APPLICATIONS

This application is a continuation of U.S. application Ser. No. 13/844,864, entitled "APPARATUS AND METHOD FOR SCHEDULING DELAYED ACKS/NACKS IN LTE CELLULAR SYSTEMS" and filed on Mar. 16, 2013, the entire contents of which is expressly incorporated by reference herein in its entirety.

BACKGROUND

Field

The present disclosure relates generally to communication systems, and more particularly, to an apparatus and method for scheduling delayed acknowledgments (ACKs)/negative acknowledgments (NACKs) in Long Term Evolution (LTE) cellular systems.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus may be an eNB. The eNB informs at least one user equipment (UE) of a change in at least one of a first configuration for transmission of ACKs/NACKs by the at least one UE for downlink (DL) transmissions received by the at least one UE and a second configuration for reception of ACKs/NACKs by the at least one UE for uplink (UL) transmissions sent by the at least one UE. The eNB indicates to the at least one UE one or more resources in which the at least one UE is to transmit the ACKs/NACKs for the received DL transmissions or is to receive the ACKs/NACKs for sent UL transmissions. In one configuration, the eNB indicates to the at least one UE the subset of the DL transmissions the at least one UE needs to acknowledge with ACKs/NACKs and the subset of the UL transmissions by the at least one UE that the eNB will acknowledge with ACKs/NACKs. The eNB may also indicate the delay period between the DL transmission and the corresponding ACK/NACK for that transmission or the UL transmission and the corresponding ACK/NACK for that transmission. The eNB may further indicate how the delay period should be implemented by UE.

In another aspect of the disclosure, a method, a computer program product, and an apparatus are provided. The apparatus may be a UE. The UE receives information of a change in at least one of a first configuration for transmission of ACKs/NACKs for DL transmissions received by the UE and a second configuration for reception of ACKs/NACKs for UL transmissions sent by the UE. The UE receives an indication comprising one or more resources in which the ACKs/NACKs for the received DL transmissions are to be transmitted or in which the ACKs/NACKs for sent UL transmissions are to be received. The UE receives an indication of the subset of the DL transmissions that the UE needs to acknowledge to eNB and/or the subset of the UL transmissions that are to be acknowledged by eNB.

BRIEF DESCRIPTION OF THE DRAWINGS

FIGS. 8A, 8B, and 8C are diagrams illustrating LTE frames showing transmissions and corresponding acknowledgements.

DETAILED DESCRIPTION

Figure 1:
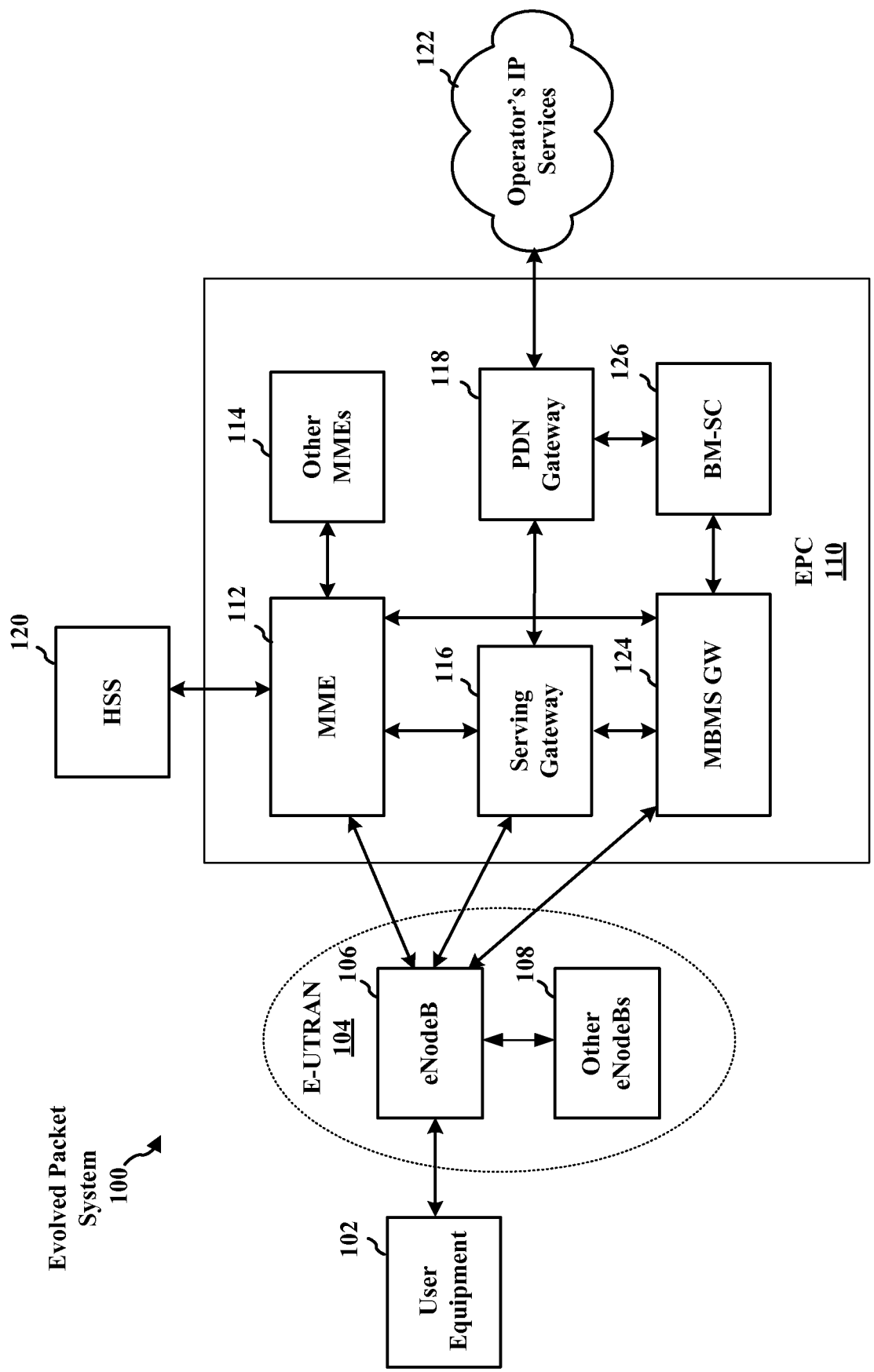
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 includes a Mobility Management Entity (MME) 112, other MMES 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, an intranet, an IP Multimedia Subsystem (IMS), and a PS Streaming Service (PSS). The BM-SC 126 is the source of MBMS traffic. The MBMS Gateway 124 distributes the MBMS traffic to the eNBs 106, 108.

Figure 2:
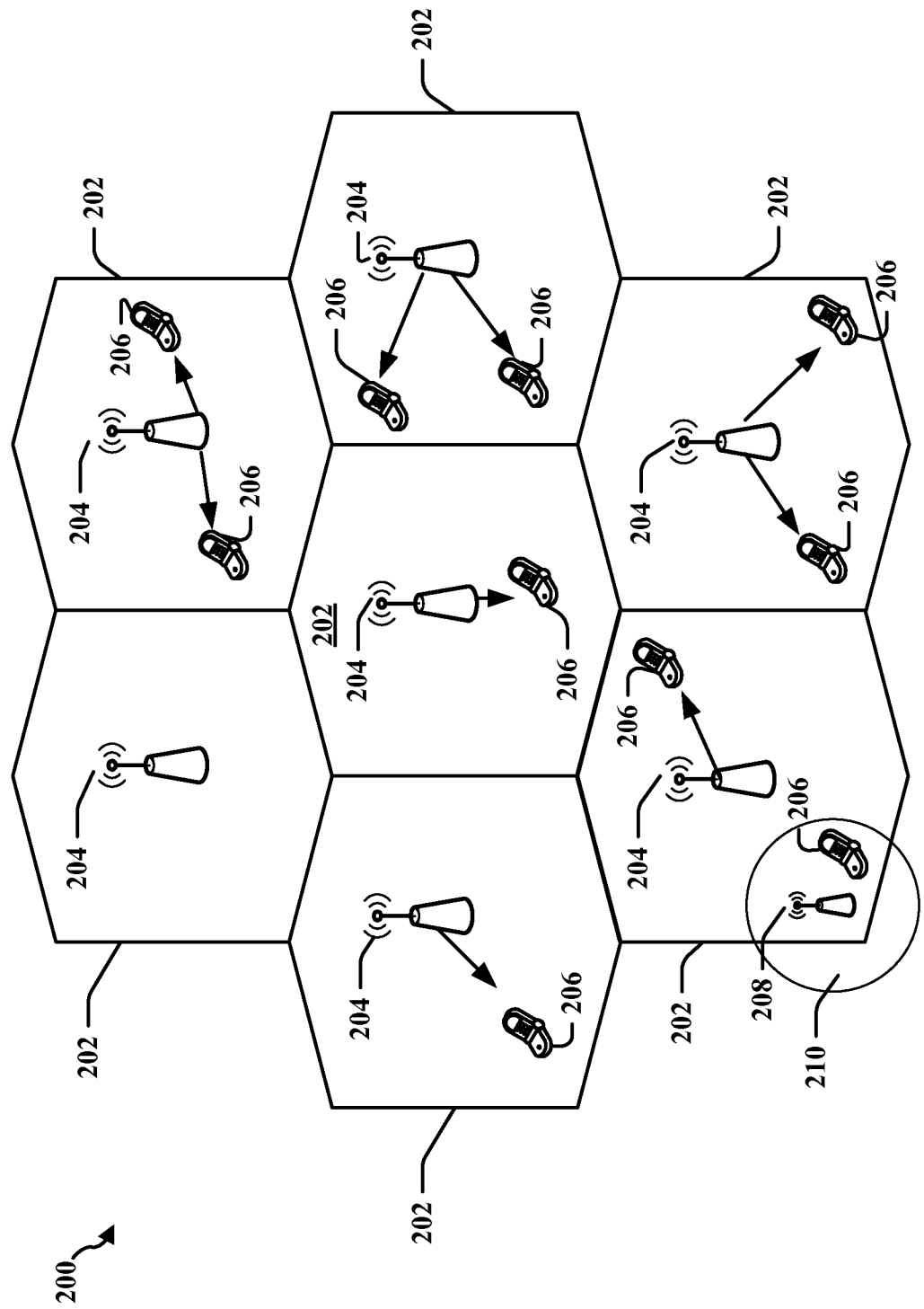
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
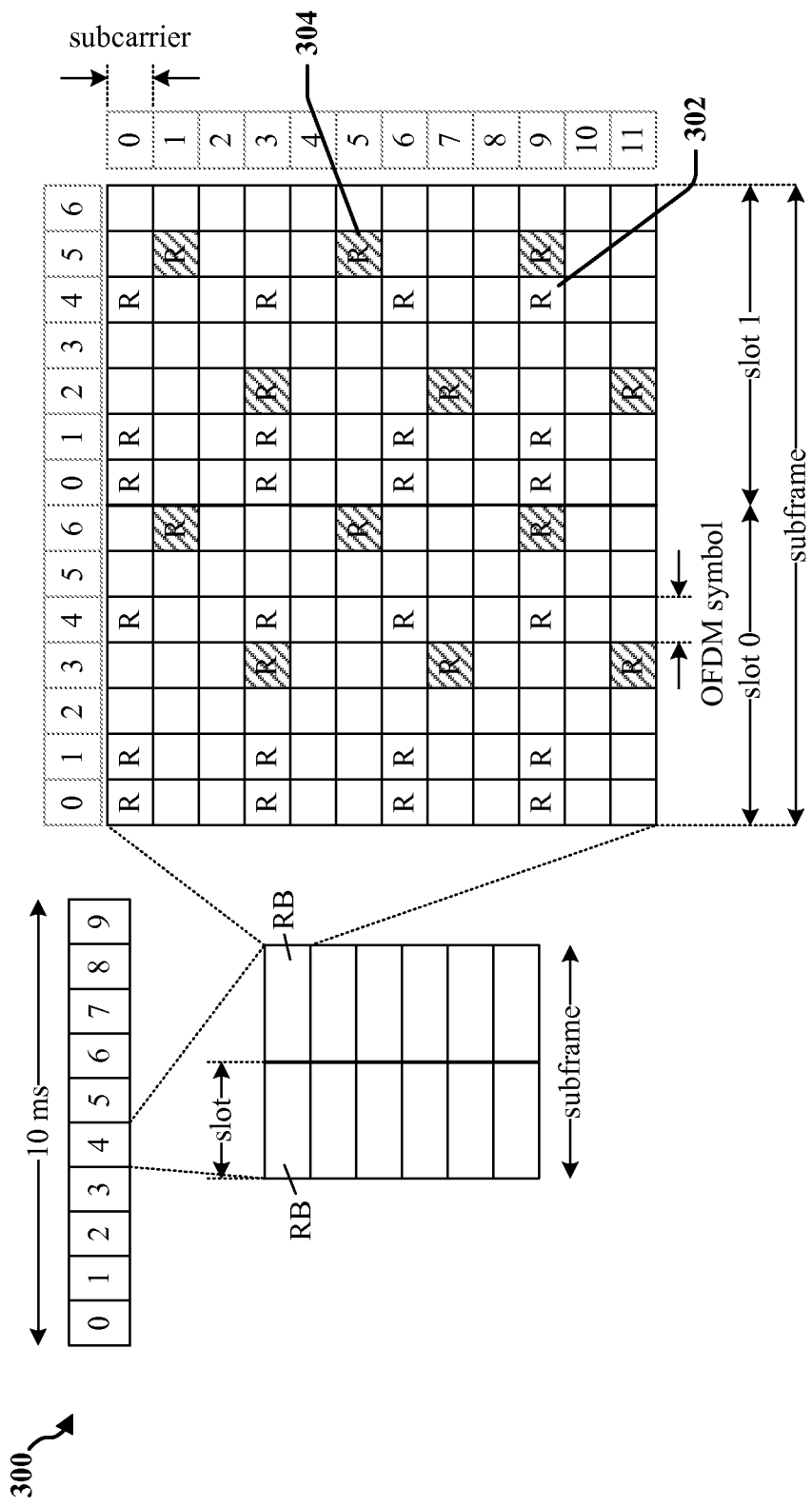
FIG. 3 is a diagram illustrating an example of a DL frame structure in LTE.

FIG. 3 is a diagram 300 illustrating an example of a DL frame structure in FDD-LTE. A frame (10 ms) is be divided into 10 equally sized sub-frames. Each subframe includes two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
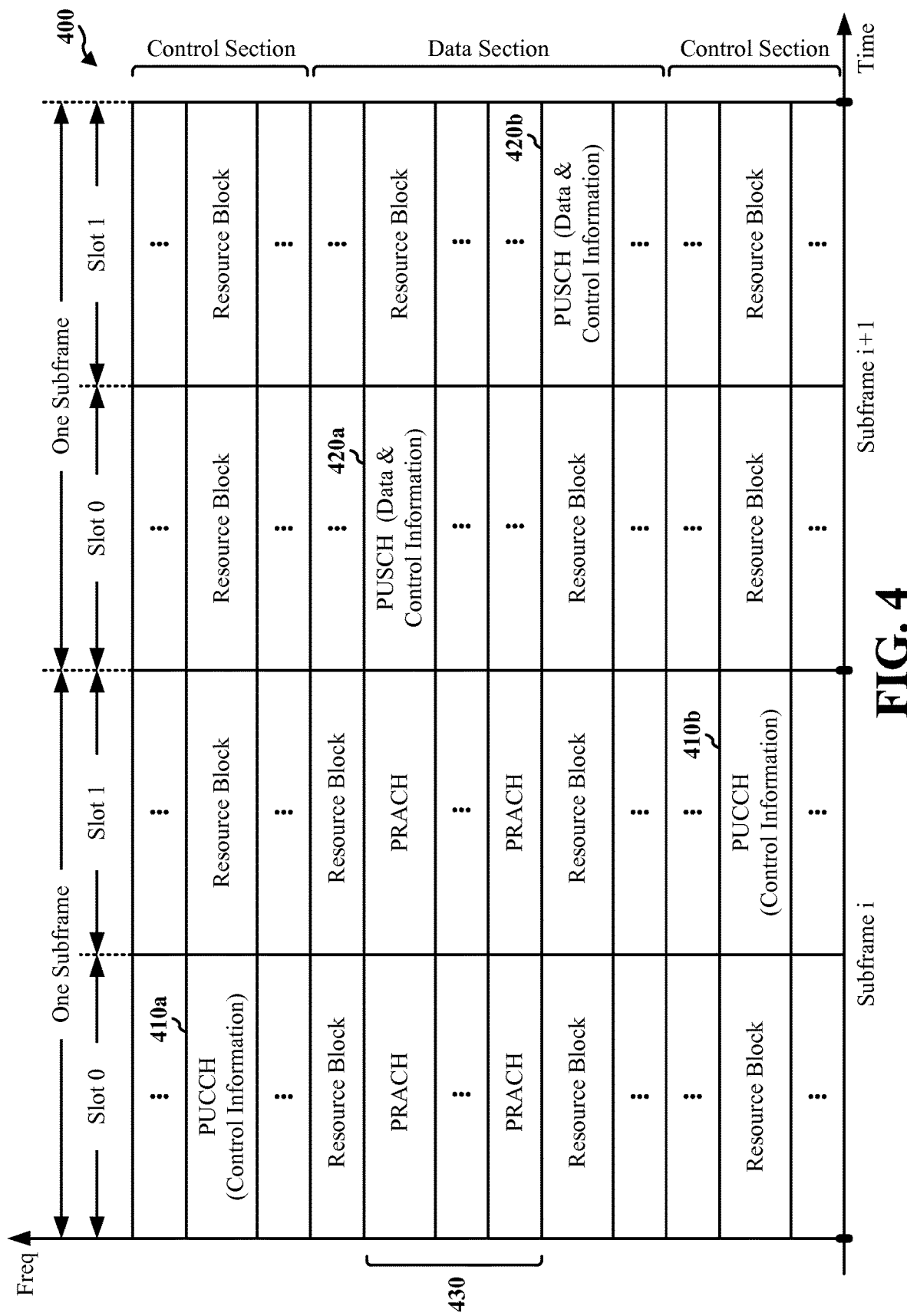
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
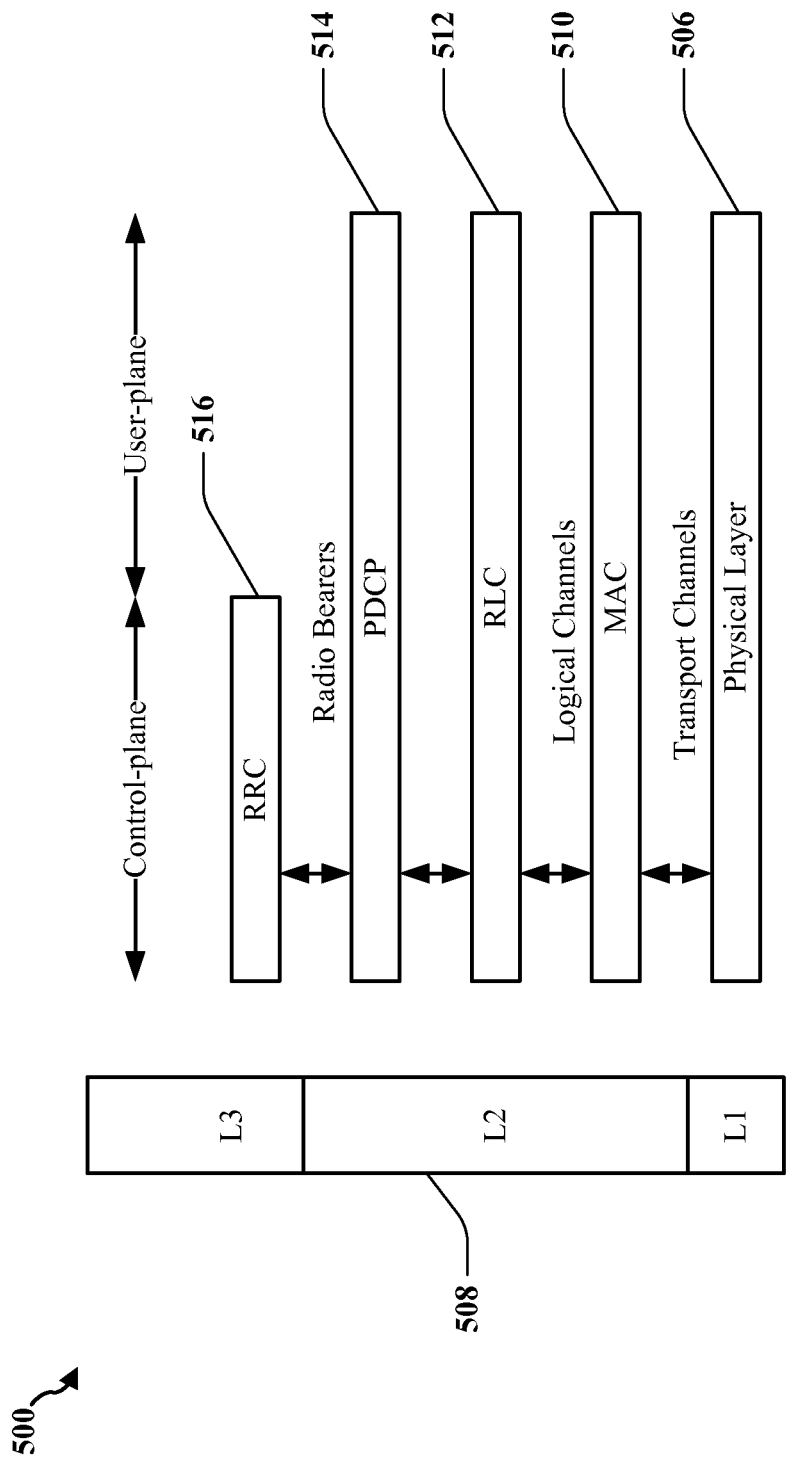
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
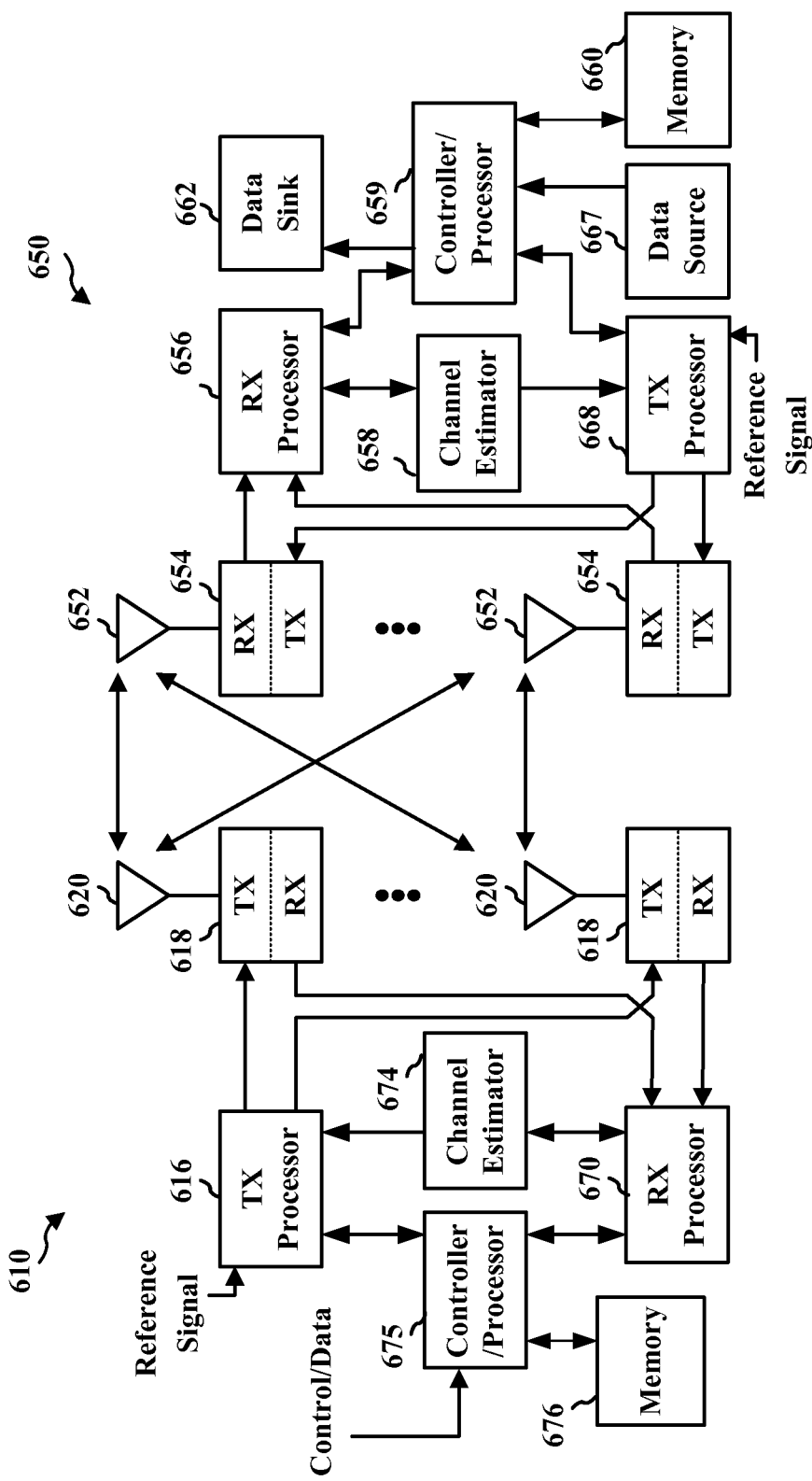
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

In LTE systems, ACKs to UL and DL transmissions are automatically scheduled. In FDD systems, for example, an ACK/NACK to a transmission may be scheduled after 4 subframes. In TDD systems, the scheduling depends on the UL-DL configuration. In some subframes, however, the interference to the receiver may be high causing ACKs/NACKs to be unreliable. For example, a femto cell may operate in the coverage of a macrocell and may not time-share the resources with a macro base station. In such a case, the femto eNB may prefer to schedule the ACK/NACK transmission after a delay. Another example where such a delay may be preferred is a power save mode of a femto cell. A small cell eNB may turn off its receiver during certain subframes and may schedule ACK/NACK transmissions for the DL transmission in a later subframe. Moreover, depending on the HARQ stage, some ACK/NACK transmissions may be redundant. For example, if the HARQ process is expected to be complete in five transmissions, the first two NACK transmissions are for the most part redundant. In this case, an eNB may prefer to receive only a subset of the ACK/NACK transmissions. The eNB may indicate to the UE the subset of DL transmissions for which ACKs/NACKs are to be transmitted. This helps the UE to save power as well as reduce the interference in the shared control channel.

Figure 7:
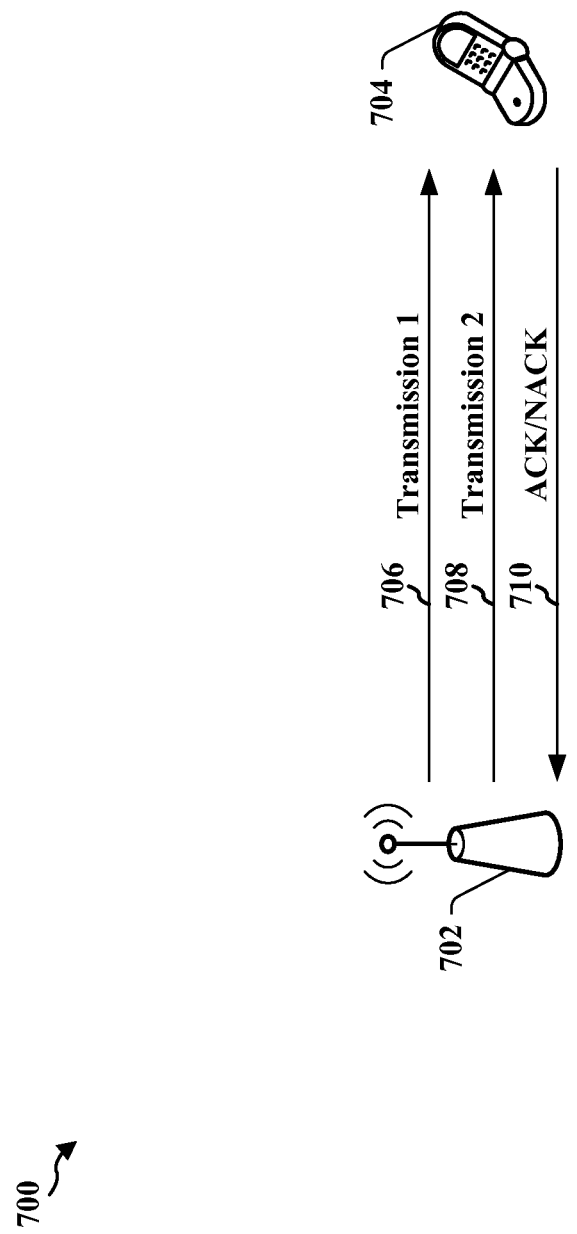
FIG. 7 is a diagram of a wireless communications system.

FIG. 7 is a diagram 700 of a wireless communications system. The wireless communications system 700 includes an eNB 702 and a UE 704 in communication with the eNB 702. As shown in FIG. 7, the eNB 702 may send a first transmission 706 and subsequently send a second transmission 708 to the UE 704. For example, the first and second transmissions 706, 708 may be data transmissions. As discussed infra, the UE 704 may send ACKs/NACKs 710 to the eNB 702 for the first transmission 706 and/or the second transmission 708 in accordance with a configuration for transmitting ACKs/NACKs applied by the UE 704.

In an aspect, the eNB 702 may inform the UE 704 of a change in a first configuration for transmission of ACKs/NACKs by the UE 704 for DL transmissions received by the UE 704. The eNB 702 may indicate to the UE 704 one or more resources in which the UE 704 is to transmit the ACKs/NACKs for the received DL transmissions or is to receive the ACKs/NACKs for sent UL transmissions. For example, the one or more resources may be indices of subframes or indices of resources in those subframes in which ACKs/NACKs are to be transmitted. In one aspect the indication may include a first set of resources that are to be used by the UE 704 when transmitting the ACKs/NACKs for the received DL transmissions. In one configuration, the indication of the first set of resources or the second set of resources may be an explicit indication. For example, the explicit indication may identify specific subframes in which the UE 704 may transmit or receive ACKs/NACKs. In another configuration, the indication of the first set of resources or the second set of resources may be an implicit indication. In such a configuration, the implicit indication may be based on a function of an identity of the UE 704, an index of a resource of a DL transmission, and/or a delay associated with transmission of the ACKs/NACKs for the received DL transmissions.

The eNB 702 may send a delay period to the UE 704 for delaying transmission of ACKs/NACKs. For example, the delay period may be represented as a number of subframes, such as 6 subframes, or as a time period, such as 6.0 milliseconds (ms). In an aspect, the eNB 702 may indicate to the UE 704 one or more of the received DL transmissions that are to be acknowledged by the UE 704. In another aspect, the indication of the one or more of the received DL transmissions that are to be acknowledged by the UE 704 is used to configure the UE 704 to send the ACKs/NACKs for only a subset of the received DL transmissions. The subset of the DL transmissions that need to be acknowledged may be predetermined or may depend on the outcome of the transmissions. For example, the subset of the received DL transmissions may include every third transmission, such that the UE 704 is configured to send an ACK/NACK only for every third transmission in a sequence of transmissions. As another example, the subset of the received DL transmissions may include all transmissions except for transmissions indicated as including new data. As another example, the subset of the received DL transmissions may include transmissions indicating new data and the transmissions for which HARQ process decodes the transmissions successfully.

FIG. 8A is a diagram illustrating an LTE frame 802 showing transmissions and corresponding acknowledgements to the transmissions. With reference to FIG. 8A, the eNB 702 may send a first transmission ("Tx1") in subframe 0 ("SF0") and a second transmission ("Tx2") in subframe 1 ("SF1"). A transmission may be qualified as the first transmissions if it is the first transmission of a new HARQ process or it is the last unacknowledged transmission. The eNB 702 may receive concurrently a first ACK/NACK ("ACK1") to the first transmission and a second ACK/NACK ("ACK2") to the second transmission in a subframe that is delayed from the subframe in which the first transmission was sent based on the delay period indicated by the eNB 702. The delay period may also indicate the window of transmissions starting with the first transmission that needs to be acknowledged after the delay period. For example, in FIG. 8A, if the delay period is six subframes with respect to the subframe in which the first transmission was sent, the eNB 702 receives ACK1 and ACK2 in subframe 6 ("SF6"). In an aspect, the first transmission and/or the second transmission may include two or more segments. In such aspect, the eNB 702 may receive two or more ACKs/NACKs corresponding to the two or more segments of the first transmission and/or two or more ACKs/NACKs corresponding to the two or more segments of the second transmission in SF6.

FIG. 8B is a diagram illustrating an LTE frame 804 showing transmissions and corresponding acknowledgements to the transmissions. With reference to FIG. 8B, the eNB 702 may send a first transmission ("Tx1") in subframe 0 ("SF0") and a second transmission ("Tx2") in subframe 1 ("SF1"). The eNB 702 may receive a first ACK/NACK ("ACK1") to the first transmission in a subframe delayed from SF0 based on the delay period. The eNB 702 may receive a second ACK/NACK ("ACK2") to the second transmission in a subframe delayed from SF1 based on the delay period. For example, in FIG. 8B, if the delay period is six subframes, the eNB 702 may receive ACK1 in SF6 and ACK2 in subframe 7 ("SF7"). In an aspect, the first transmission and/or the second transmission may include two or more segments. In such aspect, the eNB 702 may receive in SF6 two or more ACKs/NACKs corresponding to the two or more segments of the first transmission and/or two or more ACKs/NACKs in SF7 corresponding to the two or more segments of the second transmission.

FIG. 8C is a diagram illustrating an LTE frame 806 showing transmissions and corresponding acknowledgements to the transmissions. With reference to FIG. 8C, the eNB 702 may send a first transmission ("Tx1") in subframe 0 ("SF0") and a second transmission ("Tx2") in subframe 1 ("SF1"). The eNB 702 may receive a combined ACK/NACK ("ACK1,2") for both the first transmission and the second transmission in a subframe that is delayed from the subframe in which the first transmission was sent based on the delay period. For example, in FIG. 8C, if the delay period is six subframes with respect to the subframe in which the first transmission was sent, the eNB 702 may receive ACK1,2 in SF6. In an aspect, the combined ACK/NACK may be a logical AND of the ACKs of the two transmissions.

In an aspect, the UE 704 may receive information of a change in a first configuration for transmission of ACKs/NACKs for DL transmissions received by the UE 704 and/or a second configuration for reception of ACKs/NACKs for UL transmissions sent by the UE 704. The UE 704 may further receive an indication including one or more resources in which the ACKs/NACKs for the received DL transmissions are to be transmitted or in which the ACKs/NACKs for sent UL transmissions are to be received. For example, the one or more resources may be subframes in which ACKs/NACKs are to be transmitted or received. In an aspect, the indication may include a first set of resources that are to be used by the UE 704 when transmitting the ACKs/NACKs for the received DL transmissions and/or a second set of resources that are to be used by the UE 704 when receiving the ACKs/NACKs for sent UL transmissions. In one configuration, the indication of the first set of resources or the second set of resources may be an explicit indication. For example, the explicit indication may identify specific subframes in which the UE 704 may transmit or receive ACKs/NACKs. In another configuration, the indication of the first set of resources or the second set of resources may be an implicit indication. In such a configuration, the implicit indication may be based on a function of an identity of the UE 704, an index of a resource of a DL transmission, and/or a delay associated with transmission of the ACKs/NACKs for the received DL transmissions.

The UE 704 may receive a delay period for delaying transmission of ACKs/NACKs. For example, the delay period may be represented as a number of subframes, such as 6 subframes, or as a time period, such as 6.0 ms. The UE 704 may receive an indication of one or more of the received DL transmissions that are to be acknowledged. In one aspect, the indication indicates that the UE 704 is to send ACKs/NACKs for only a subset of the received DL transmissions. For example, the subset of the received DL transmissions may include every third transmission, such that the UE 704 sends an ACK/NACK only for every third transmission in a sequence of transmissions. As another example, the subset of the received DL transmissions may include all transmissions except for transmissions indicated as including new data. The UE 704 may receive a first transmission in a first subframe. The UE 704 may then receive a second transmission in a second subframe subsequent to the first subframe. For example, the first and second transmissions may be data transmissions. The UE 704 may then send ACKs/NACKs corresponding to the first and second data transmissions based on the configuration for transmission of ACKs/NACKs applied by the UE 704.

Figure 9A:
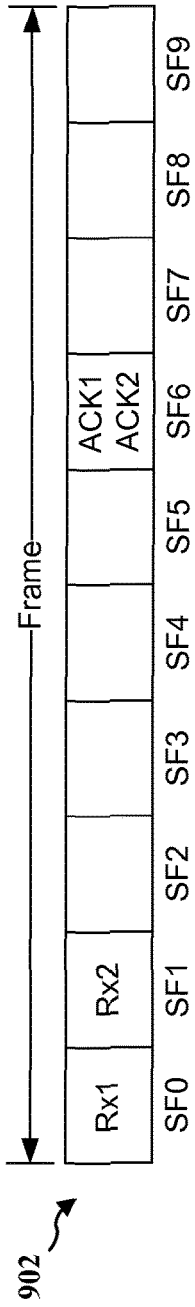
FIGS. 9A, 9B, 9C, and 9D are diagrams illustrating LTE frames showing receptions of transmissions and corresponding acknowledgments.

FIG. 9A is a diagram illustrating an LTE frame 902 showing receptions of transmissions and corresponding acknowledgements to the received transmissions. With reference to FIG. 9A, the UE 704 may receive a first transmission ("Rx1") in subframe 0 ("SF0") and a second transmission ("Rx2") in subframe 1 ("SF1"). The UE 704 may then send concurrently a first ACK/NACK ("ACK1") to the first transmission and a second ACK/NACK ("ACK2") to the second transmission in a subframe that is delayed from the subframe in which the first transmission was received based on the delay period. For example, in FIG. 9A, if the delay period is six subframes with respect to the subframe in which the first transmission was received, the UE 704 may send ACK1 and ACK2 in subframe 6 ("SF6"). In an aspect, the first transmission and/or the second transmission may include two or more segments. In such aspect, the UE 704 may send two or more ACKs/NACKs corresponding to the two or more segments of the first transmission and/or two or more ACKs/NACKs corresponding to the two or more segments of the second transmission in SF6.

Figure 9B:
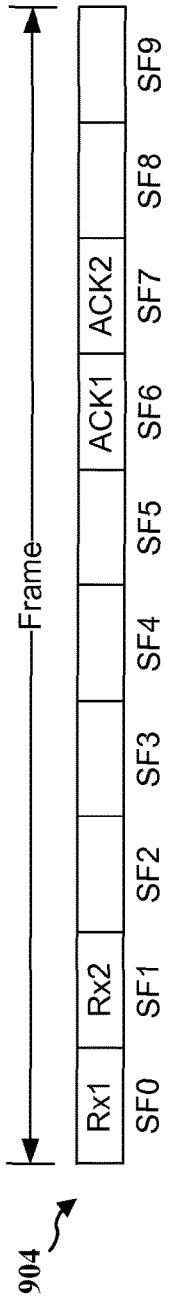

FIG. 9B is a diagram illustrating an LTE frame 904 showing receptions of transmissions and corresponding acknowledgements to the received transmissions. With reference to FIG. 9B, the UE 704 may receive a first transmission ("Rx1") in subframe 0 ("SF0") and a second transmission ("Rx2") in subframe 1 ("SF1"). The UE 704 may send a first ACK/NACK ("ACK1") to the first transmission in a subframe delayed from SF0 based on the delay period. The UE 704 may send a second ACK/NACK ("ACK2") to the second transmission in a subframe delayed from SF1 based on the delay period. For example, in FIG. 9B, if the delay period is six subframes, the UE 704 may send ACK1 in SF6 and ACK2 in subframe 7 ("SF7"). In an aspect, the first transmission and/or the second transmission may include two or more segments. In such aspect, the UE 704 may send two or more ACKs/NACKs corresponding to the two or more segments of the first transmission in SF6 and/or two or more ACKs/NACKs corresponding to the two or more segments of the second transmission in SF7.

Figure 9C:
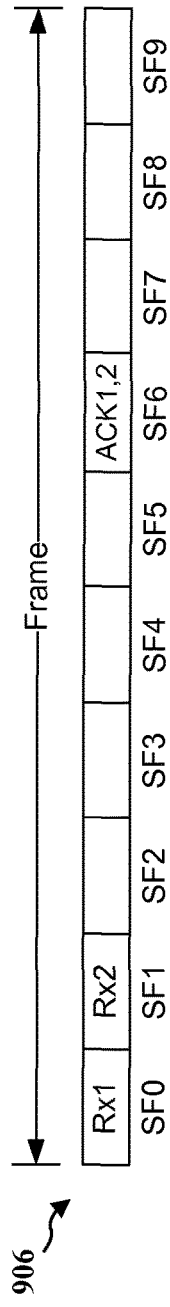

FIG. 9C is a diagram illustrating an LTE frame 906 showing receptions of transmissions and corresponding acknowledgements to the received transmissions. With reference to FIG. 9C, the UE 704 may receive a first transmission ("Rx1") in subframe 0 ("SF0") and a second transmission ("Rx2") in subframe 1 ("SF1"). The UE 704 may send a combined ACK/NACK ("ACK1,2") for both the first transmission and the second transmission in a subframe that is delayed from the subframe in which the first transmission was received based on the delay period. For example, in FIG. 9C, if the delay period is six subframes with respect to the subframe in which the first transmission was received, the UE 704 sends ACK1,2 in SF6.

Figure 9D:
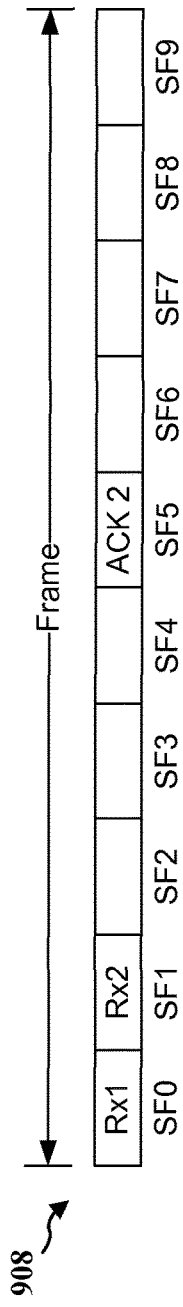

FIG. 9D is a diagram illustrating an LTE frame 908 showing receptions of transmissions and corresponding acknowledgements to the received transmissions. With reference to FIG. 9D, the UE 704 may receive a first transmission ("Rx1") in subframe 0 ("SF0") and a second transmission ("Rx2") in subframe 1 ("SF1"). The UE 704 may send an ACK/NACK ("ACK2") for only a subset of the received transmissions based on the indication of the one or more of the received transmissions that are to be acknowledged (i.e., "selective ACK/NACK"). For example, if the indication requires the UE 704 to send an ACK/NACK for every second transmission in a sequence of transmissions received by the UE 704, the UE 704 may send ACK2 in subframe 5 ("SF5") only for the second transmission that was received in SF1. As shown in FIG. 9D, the UE 704 may send ACK2 four subframes after SF1 in which the second transmission was received by the UE 704. Note that the absence of an ACK/NACK may be caused by either "selective ACK/NACK" or a failure to receive Physical Downlink Control Channel (PDCCH) by a UE. However, such confusion may be avoided in case of semi persistent schedules (SPS). In case of SPS, the PDCCH carries allocation information only in the beginning of the SPS. Therefore, once the reception of PDCCH is confirmed through initial ACK/NACK, subsequent ACKs/NACKs may be delayed without any such confusion.

Figure 10:
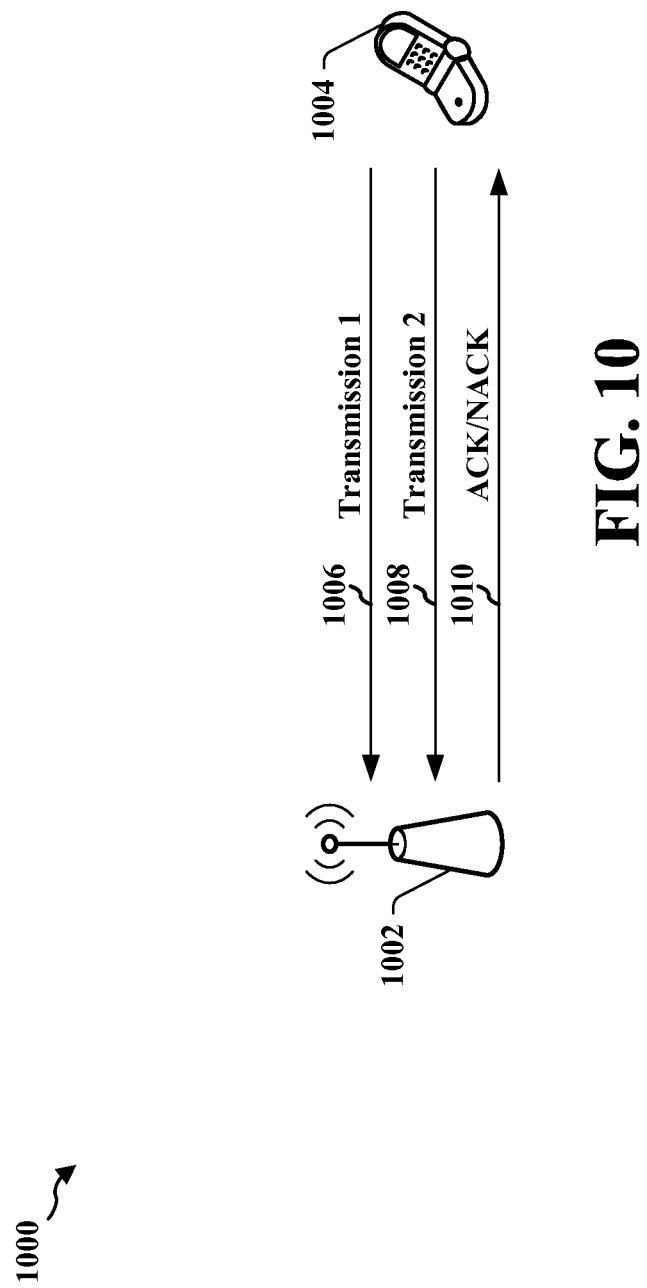
FIG. 10 is a diagram of a wireless communications system.

FIG. 10 is a diagram 1000 of a wireless communications system. The wireless communications system 1000 includes an eNB 1002 and a UE 1004 in communication with the eNB 1002. As shown in FIG. 10, the UE 1004 may send a first transmission 1006 and subsequently send a second transmission 1008 to the eNB 1002. For example, the first and second transmissions 1006, 1008 may be data transmissions. The eNB 1002 may send ACKs/NACKs 1010 to the UE 1004 for the first transmission 1006 and/or the second transmission 1008 in accordance with a configuration for transmitting ACKs/NACKs applied by the eNB 1002.

In an aspect, the eNB 1002 may inform the UE 1004 of a change in a configuration for reception of ACKs/NACKs by the UE 1004 for UL transmissions sent by the UE 1004. The eNB 1002 may indicate to the UE 1004 one or more resources in which the UE 1004 is to receive the ACKs/NACKs for the transmitted UL transmissions. For example, the one or more resources may be indices of subframes or indices of resources in those subframes in which ACKs/NACKs are to be received. In one aspect the indication may include a set of resources that are to be used by the UE 1004 when receiving the ACKs/NACKs for sent UL transmissions. In one configuration, the indication of the set of resources may be an explicit indication. For example, the explicit indication may identify specific subframes in which the UE 1004 may receive ACKs/NACKs. In another configuration, the indication of the set of resources may be an implicit indication. In such a configuration, the implicit indication may be based on a function of an identity of the UE 1004, an index of a resource of a UL transmission, and/or a delay associated with transmission of the ACKs/NACKs for the transmitted UL transmissions.

The eNB 1002 may send a delay period to the UE 1004 for delaying reception of ACKs/NACKs. For example, the delay period may be represented as a number of subframes, such as 6 subframes, or as a time period, such as 6.0 milliseconds (ms). In one aspect, the eNB 1002 may indicate to the UE 1004 one or more of the transmitted UL transmissions that are to be acknowledged by the eNB 1002. In an aspect, the indication of the one or more of the transmitted UL transmissions that are to be acknowledged by the eNB 1002 is used to configure the UE 1004 to receive the ACKs/NACKs for only a subset of the transmitted UL transmissions. The subset of the UL transmissions that need to be acknowledged may be predetermined or may depend on the outcome of the transmissions. For example, the subset of the transmitted UL transmissions may include every third transmission, such that the UE 1004 is configured to receive an ACK/NACK only for every third transmission in a sequence of transmissions. As another example, the subset of the transmitted UL transmissions may include all transmissions except for transmissions indicated as including new data. As another example, the subset of the transmitted UL transmissions may include transmissions indicating new data and the transmissions for which HARQ process decodes the transmissions successfully.

Referring to FIG. 8A, the UE 1004 may send a first transmission ("Tx1") in subframe 0 ("SF0") and a second transmission ("Tx2") in subframe 1 ("SF1"). A transmission may be qualified as the first transmissions if it is the first transmission of a new HARQ process or it is the last unacknowledged transmission. The UE 1004 may receive concurrently a first ACK/NACK ("ACK1") to the first transmission and a second ACK/NACK ("ACK2") to the second transmission in a subframe that is delayed from the subframe in which the first transmission was sent based on the delay period indicated by the eNB. The delay period may also indicate the window of transmissions starting with the first transmission that needs to be acknowledged after the delay period. For example, in FIG. 8A, if the delay period is six subframes with respect to the subframe in which the first transmission was sent, the UE 1004 receives ACK1 and ACK2 in subframe 6 ("SF6"). In an aspect, the first transmission and/or the second transmission may include two or more segments. In such aspect, the UE 1004 may receive two or more ACKs/NACKs corresponding to the two or more segments of the first transmission and/or two or more ACKs/NACKs corresponding to the two or more segments of the second transmission in SF6.

Referring to FIG. 8B, the UE 1004 may send a first transmission ("Tx1") in subframe 0 ("SF0") and a second transmission ("Tx2") in subframe 1 ("SF1"). The UE 1004 may receive a first ACK/NACK ("ACK1") to the first transmission in a subframe delayed from SF0 based on the delay period. The UE 1004 may receive a second ACK/NACK ("ACK2") to the second transmission in a subframe delayed from SF1 based on the delay period. For example, in FIG. 8B, if the delay period is six subframes, the UE 1004 may receive ACK1 in SF6 and ACK2 in subframe 7 ("SF7"). In an aspect, the first transmission and/or the second transmission may include two or more segments. In such aspect, the UE 1004 may receive in SF6 two or more ACKs/NACKs corresponding to the two or more segments of the first transmission and/or two or more ACKs/NACKs in SF7 corresponding to the two or more segments of the second transmission.

Referring to FIG. 8C, the UE 1004 may send a first transmission ("Tx1") in subframe 0 ("SF0") and a second transmission ("Tx2") in subframe 1 ("SF1"). The UE 1004 may receive a combined ACK/NACK ("ACK1,2") for both the first transmission and the second transmission in a subframe that is delayed from the subframe in which the first transmission was sent based on the delay period. For example, in FIG. 8C, if the delay period is six subframes with respect to the subframe in which the first transmission was sent, the UE 1004 may receive ACK1,2 in SF6. In an aspect, the combined ACK/NACK may be a logical AND of the ACKs of the two transmissions.

In an aspect, the UE 1004 may receive information of a change in a configuration for reception of ACKs/NACKs for UL transmissions sent by the UE 1004. The UE 1004 may further receive an indication including one or more resources in which the ACKs/NACKs for sent UL transmissions are to be received. For example, the one or more resources may be subframes in which ACKs/NACKs are to be received. In an aspect, the indication may include a set of resources that are to be used by the UE 1004 when receiving the ACKs/NACKs for sent UL transmissions. In one configuration, the indication of the set of resources may be an explicit indication. For example, the explicit indication may identify specific subframes in which the UE 1004 may transmit or receive ACKs/NACKs. In another configuration, the indication of the set of resources may be an implicit indication. In such a configuration, the implicit indication may be based on a function of an identity of the UE 1004, an index of a resource of a UL transmission, and/or a delay associated with transmission of the ACKs/NACKs for the received UL transmissions.

The UE 1004 may receive a delay period for delaying reception of ACKs/NACKs. For example, the delay period may be represented as a number of subframes, such as 6 subframes, or as a time period, such as 6.0 ms. The UE 1004 may receive an indication of one or more of the transmitted UL transmissions that are to be acknowledged. In one aspect, the indication indicates that the eNB 1002 is to send ACKs/NACKs for only a subset of the transmitted UL transmissions. For example, the subset of the transmitted UL transmissions may include every third transmission, such that the eNB 1002 sends an ACK/NACK only for every third transmission in a sequence of transmissions. As another example, the subset of the transmitted UL transmissions may include all transmissions except for transmissions indicated as including new data. The eNB 1002 may receive a first transmission in a first subframe. The eNB 1002 may then receive a second transmission in a second subframe subsequent to the first subframe. For example, the first and second transmissions may be data transmissions. The eNB 1002 may then send ACKs/NACKs corresponding to the first and second data transmissions based on the configuration for transmission of ACKs/NACKs applied by the eNB 1004.

Referring to FIG. 9A, the eNB 1002 may receive a first transmission ("Rx1") in subframe 0 ("SF0") and a second transmission ("Rx2") in subframe 1 ("SF1"). The eNB 1002 may then send concurrently a first ACK/NACK ("ACK1") to the first transmission and a second ACK/NACK ("ACK2") to the second transmission in a subframe that is delayed from the subframe in which the first transmission was received based on the delay period. For example, in FIG. 9A, if the delay period is six subframes with respect to the subframe in which the first transmission was received, the eNB 1002 may send ACK1 and ACK2 in subframe 6 ("SF6"). In an aspect, the first transmission and/or the second transmission may include two or more segments. In such aspect, the eNB 1002 may send two or more ACKs/NACKs corresponding to the two or more segments of the first transmission and/or two or more ACKs/NACKs corresponding to the two or more segments of the second transmission in SF6.

Referring to FIG. 9B, the eNB 1002 may receive a first transmission ("Rx1") in subframe 0 ("SF0") and a second transmission ("Rx2") in subframe 1 ("SF1"). The eNB 1002 may send a first ACK/NACK ("ACK1") to the first transmission in a subframe delayed from SF0 based on the delay period. The eNB 1002 may send a second ACK/NACK ("ACK2") to the second transmission in a subframe delayed from SF1 based on the delay period. For example, in FIG. 9B, if the delay period is six subframes, the eNB 1002 may send ACK1 in SF6 and ACK2 in subframe 7 ("SF7"). In an aspect, the first transmission and/or the second transmission may include two or more segments. In such aspect, the eNB 1002 may send two or more ACKs/NACKs corresponding to the two or more segments of the first transmission in SF6 and/or two or more ACKs/NACKs corresponding to the two or more segments of the second transmission in SF7.

Referring to FIG. 9C, the eNB 1002 may receive a first transmission ("Rx1") in subframe 0 ("SF0") and a second transmission ("Rx2") in subframe 1 ("SF1"). The eNB 1002 may send a combined ACK/NACK ("ACK1,2") for both the first transmission and the second transmission in a subframe that is delayed from the subframe in which the first transmission was received based on the delay period. For example, in FIG. 9C, if the delay period is six subframes with respect to the subframe in which the first transmission was received, the eNB 1002 sends ACK1,2 in SF6.

Referring to FIG. 9D, the eNB 1002 may receive a first transmission ("Rx1") in subframe 0 ("SF0") and a second transmission ("Rx2") in subframe 1 ("SF1"). The eNB 1002 may send an ACK/NACK ("ACK2") for only a subset of the received transmissions based on the indication of the one or more of the received transmissions that are to be acknowledged. For example, if the indication requires the eNB 1002 to send an ACK/NACK for every second transmission in a sequence of transmissions received by the eNB 1002, the eNB 1002 may send ACK2 in subframe 5 ("SF5") only for the second transmission that was received in SF1. As shown in FIG. 9D, the eNB 1002 may send ACK2 four subframes after SF1 in which the second transmission was received by the eNB 1002.

Figure 11:
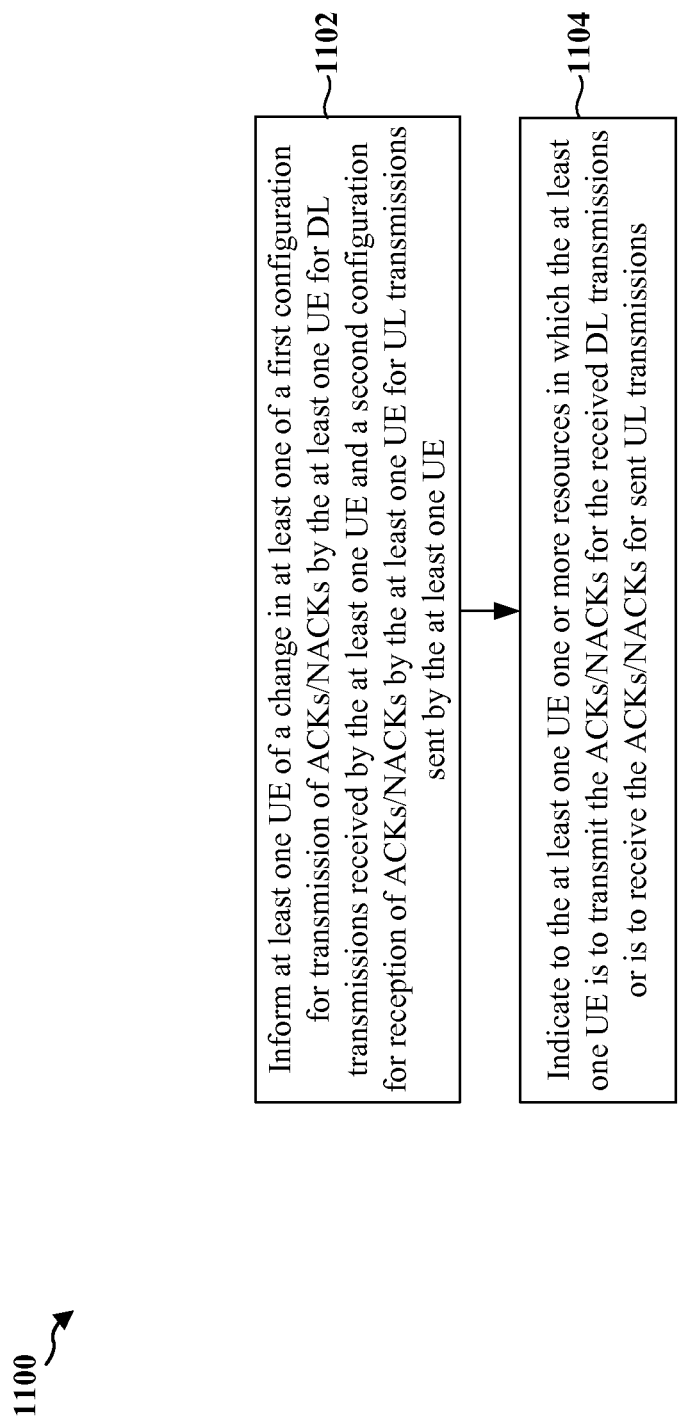
FIG. 11 is a flow chart of a method of wireless communication.

FIG. 11 is a flow chart 1000 of a method of wireless communication. The method may be performed by an eNB. At step 1102, the eNB informs at least one UE of a change in a first configuration for transmission of ACKs/NACKs by the at least one UE for DL transmissions received by the at least one UE and/or a second configuration for reception of ACKs/NACKs by the at least one UE for UL transmissions sent by the at least one UE. For example, the at least one UE may be a subset of RRC connected UEs. In one aspect, the eNB may inform the at least one UE through an RRC configuration message.

At step 1104, the eNB indicates to the at least one UE one or more resources in which the at least one UE is to transmit the ACKs/NACKs for the received DL transmissions or is to receive the ACKs/NACKs for sent UL transmissions. For example, the one or more resources may be subframes in which ACKs/NACKs are to be transmitted or received. In an aspect, the indication may include a first set of resources that are to be used by the at least one UE when transmitting the ACKs/NACKs for the received DL transmissions and/or a second set of resources that are to be used by the at least one UE when receiving the ACKs/NACKs for sent UL transmissions. In one configuration, the indication of the first set of resources or the second set of resources may be an explicit indication. For example, the explicit indication may identify specific subframes in which the UE may transmit or receive ACKs/NACKs. In another configuration, the indication of the first set of resources or the second set of resources may be an implicit indication. In such a configuration, the implicit indication may be based on a function of an identity of the at least one UE, an index of a resource of a DL transmission, and/or a delay associated with transmission of the ACKs/NACKs for the received DL transmissions. For example, a UE transmitting ACKs/NACKs after an $n^{th}$ subframe may be required to transmit in an $n^{th}$ PUCCH.

Figure 12A:
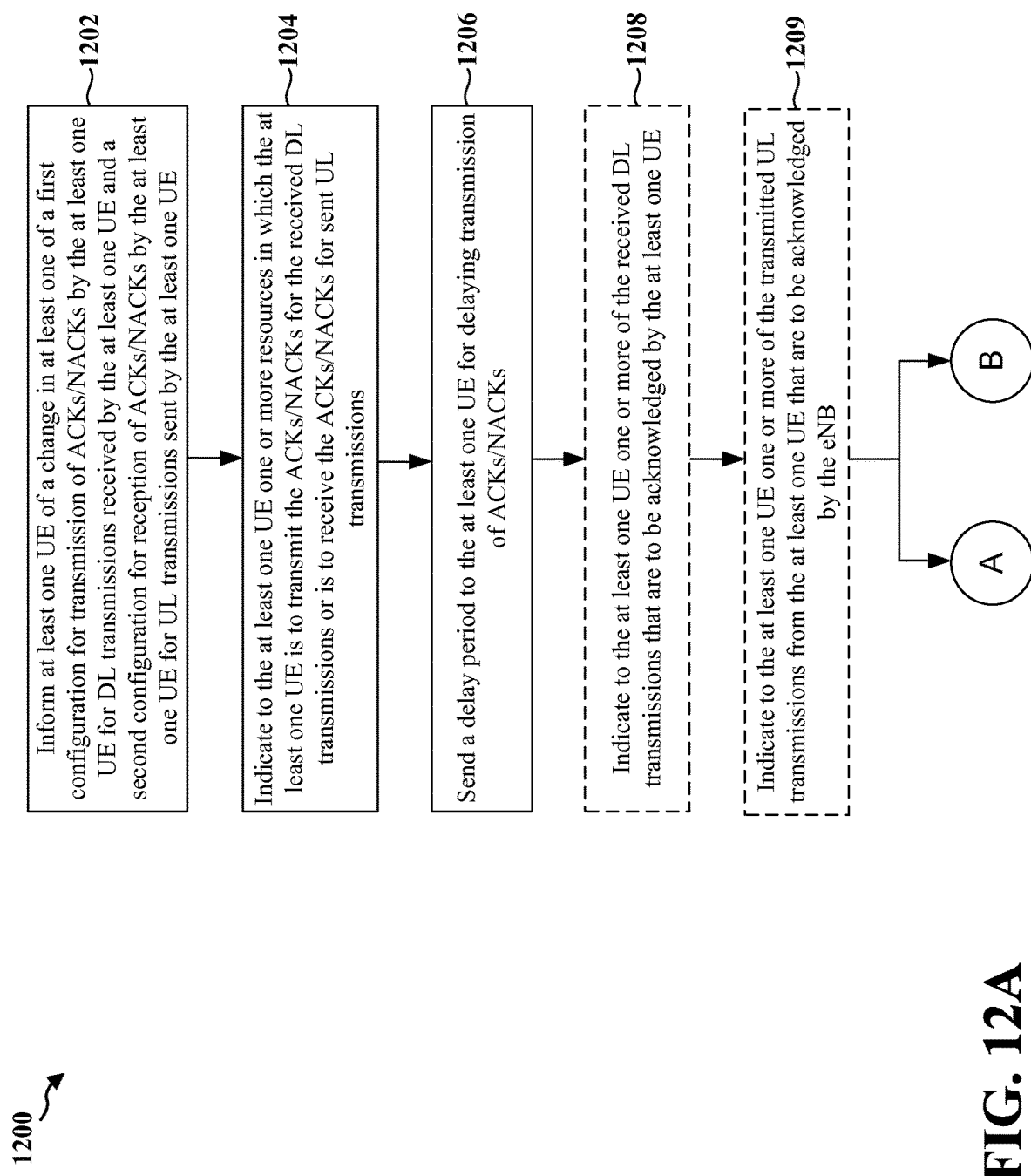
FIGS. 12A, 12B, and 12C are a flow chart of a method of wireless communication.
Figure 12B:
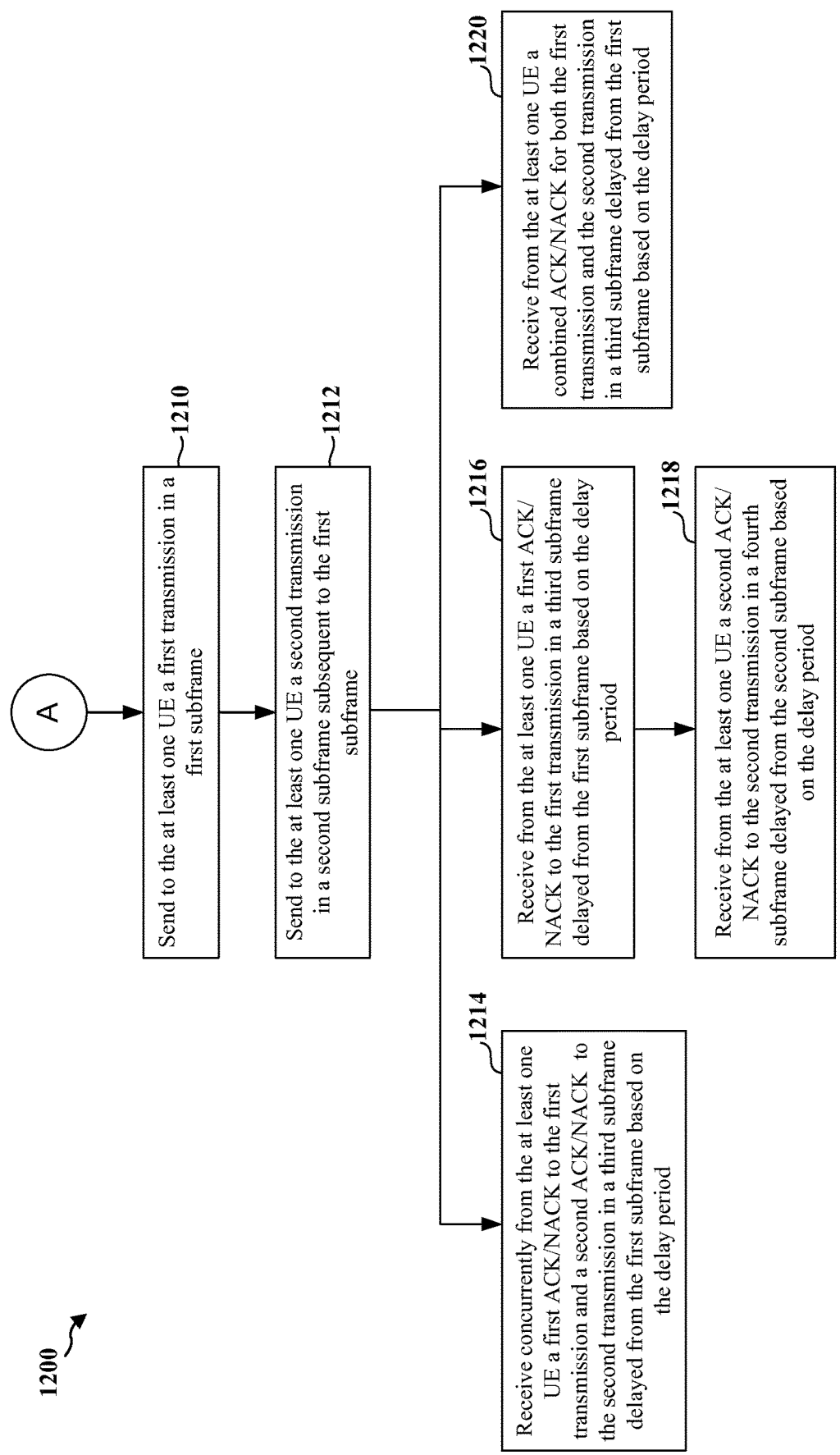
Figure 12C:
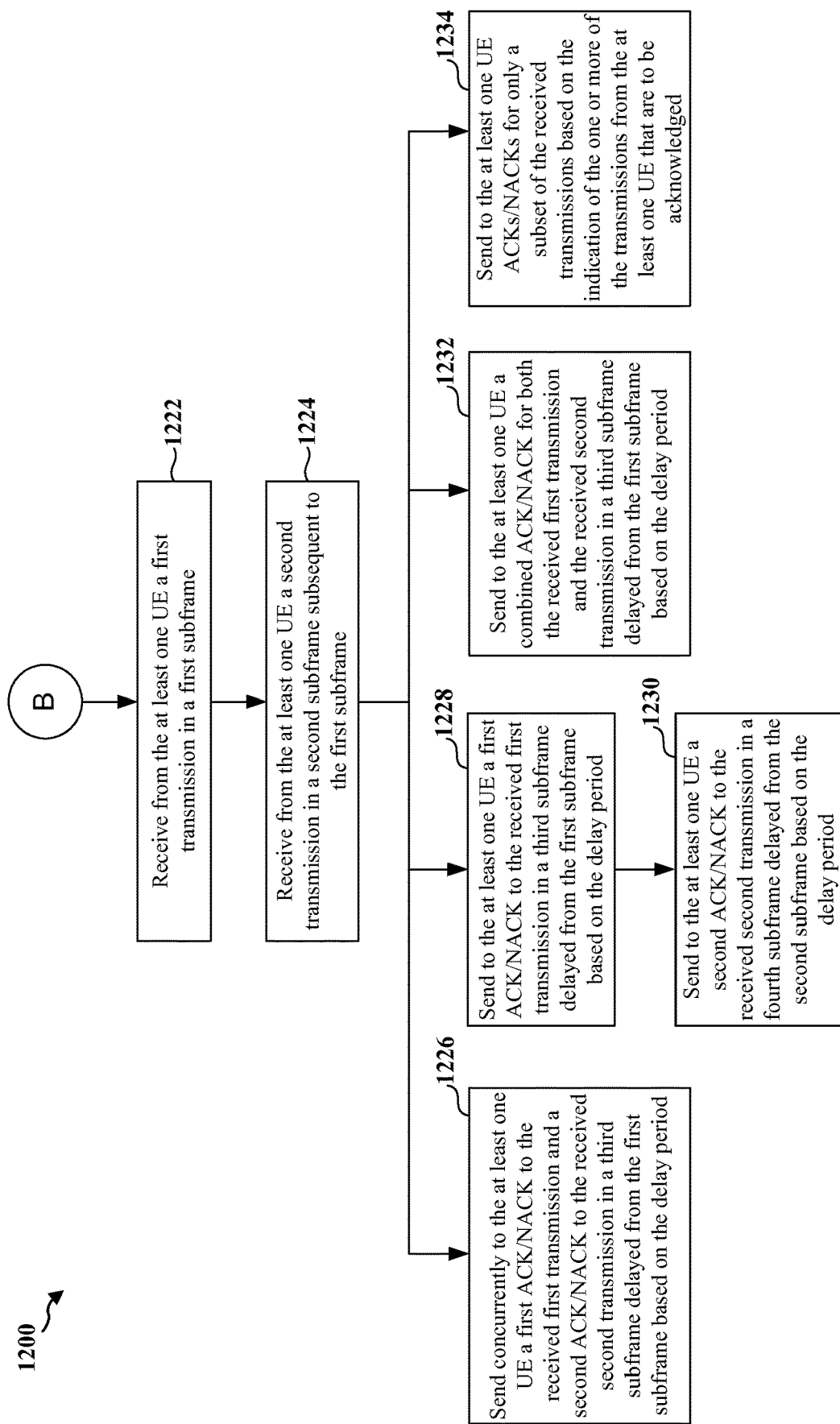

FIGS. 12A, 12B, and 12C are a flow chart 1200 of a method of wireless communication. The method may be performed by an eNB. At step 1202, the eNB informs at least one UE of a change in a first configuration for transmission of ACKs/NACKs by the at least one UE for DL transmissions received by the at least one UE and/or a second configuration for reception of ACKs/NACKs by the at least one UE for UL transmissions sent by the at least one UE. For example, the at least one UE may be a subset of RRC connected UEs. In one aspect, the eNB may inform the at least one UE through an RRC configuration message.

At step 1204, the eNB indicates to the at least one UE one or more resources in which the at least one UE is to transmit the ACKs/NACKs for the received DL transmissions or is to receive the ACKs/NACKs for sent UL transmissions. For example, the one or more resources may be subframes in which ACKs/NACKs are to be transmitted or received. In one aspect the indication may include a first set of resources that are to be used by the at least one UE when transmitting the ACKs/NACKs for the received DL transmissions and/or a second set of resources that are to be used by the at least one UE when receiving the ACKs/NACKs for sent UL transmissions. In one configuration, the indication of the first set of resources or the second set of resources may be an explicit indication. For example, the explicit indication may identify specific subframes in which the UE may transmit or receive ACKs/NACKs. In another configuration, the indication of the first set of resources or the second set of resources may be an implicit indication. In such a configuration, the implicit indication may be based on a function of an identity of the at least one UE, an index of a resource of a DL transmission, and/or a delay associated with transmission of the ACKs/NACKs for the received DL transmissions. For example, a UE transmitting ACKs/NACKs after an $n^{th}$ subframe may be required to transmit in an $n^{th}$ PUCCH.

At step 1206, the eNB sends a delay period to the at least one UE for delaying transmission of ACKs/NACKs. For example, the delay period may be six subframes or 6.0 ms.

At step 1208, the eNB indicates to the at least one UE one or more of the received DL transmissions that are to be acknowledged by the at least one UE. In an aspect, the indication of the one or more of the received DL transmissions that are to be acknowledged by the at least one UE is used to configure the at least one UE to send the ACKs/NACKs for only a subset of the received DL transmissions. For example, the subset of the received DL transmissions may include every third transmission, such that the at least one UE is configured to send an ACK/NACK only for every third transmission in a sequence of transmissions. As another example, the subset of the received DL transmissions may include all transmissions except for transmissions indicated as including new data.

At step 1209, the eNB indicates to the at least one UE one or more of the transmitted UL transmissions from the at least one UE that are to be acknowledged by the eNB. In an aspect, the indication of the one or more of the transmitted UL transmissions that are to be acknowledged by the eNB is used to configure the at least one UE to receive the ACKs/NACKs for only a subset of the transmitted UL transmissions. For example, the subset of the transmitted UL transmissions may include every third transmission, such that the UE is configured to receive an ACK/NACK only for every third transmission in a sequence of transmissions. As another example, the subset of the transmitted UL transmissions may include all transmissions except for transmissions indicated as including new data.

Referring now to FIG. 12B, at step 1210, the eNB sends to the at least one UE a first transmission in a first subframe. For example, the first transmission may be a data transmission.

At step 1212, the eNB sends to the at least one UE a second transmission in a second subframe subsequent to the first subframe. For example, the second transmission may be a data transmission.

At step 1214, the eNB receives concurrently from the at least one UE a first ACK/NACK to the first transmission and a second ACK/NACK to the second transmission in a third subframe delayed from the first subframe based on the delay period. For example, with reference to FIG. 8A in which the first transmission ("Tx1") is sent by the eNB in SF0 and the second transmission ("Tx2") is sent by the eNB in SF1, the eNB receives ACK1 and ACK2 in subframe 6 ("SF6") if the delay period is six subframes with respect to the subframe in which the first transmission was sent. In an aspect, the first transmission and/or the second transmission may include two or more segments. In such aspect, the eNB may receive two or more ACKs/NACKs corresponding to the two or more segments of the first transmission and/or two or more ACKs/NACKs corresponding to the two or more segments of the second transmission in the third subframe.

At step 1216, the eNB receives from the at least one UE a first ACK/NACK to the first transmission in a third subframe delayed from the first subframe based on the delay period. In an aspect, the first transmission may include two or more segments. In such aspect, the eNB may receive two or more ACKs/NACKs corresponding to the two or more segments of the first transmission in the third subframe.

At step 1218, the eNB receives from the at least one UE a second ACK/NACK to the second transmission in a fourth subframe delayed from the second subframe based on the delay period. In an aspect, the second transmission may include two or more segments. In such aspect, the eNB may receive two or more ACKs/NACKs corresponding to the two or more segments of the second transmission in the fourth subframe.

For example, with reference to FIG. 8B, the eNB 702 may send a first transmission ("Tx1") in subframe 0 ("SF0") and a second transmission ("Tx2") in subframe 1 ("SF1"). The eNB 702 may receive a first ACK/NACK ("ACK1") to the first transmission in a subframe delayed from SF0 based on the delay period. The eNB 702 may then receive a second ACK/NACK ("ACK2") to the second transmission in a subframe delayed from SF1 based on the delay period. For example, in FIG. 8B, if the delay period is six subframes, the eNB 702 receives ACK1 in SF6 and ACK2 in subframe 7 ("SF7").

At step 1220, the eNB receives from the at least one UE a combined ACK/NACK for both the first transmission and the second transmission in a third subframe delayed from the first subframe based on the delay period. For example, the eNB may receive a single ACK in the third subframe that acknowledges both the first transmission and the second transmission.

For example, with reference to FIG. 8C, the eNB 702 may send a first transmission ("Tx1") in subframe 0 ("SF0") and a second transmission ("Tx2") in subframe 1 ("SF1"). The eNB 702 may then receive a combined ACK/NACK ("ACK1,2") for both the first transmission and the second transmission in a subframe that is delayed from the subframe in which the first transmission was sent based on the delay period. For example, in FIG. 8C, if the delay period is six subframes with respect to the subframe in which the first transmission was sent, the eNB 702 receives ACK1,2 in SF6.

Referring now to FIG. 12C, at step 1222, the eNB receives from the at least one UE a first transmission in a first subframe. For example, the first transmission may be a data transmission.

At step 1224, the eNB receives a second transmission from the at least one UE in a second subframe subsequent to the first subframe. For example, the second transmission may be a data transmission.

At step 1226, the eNB may send concurrently to the UE a first ACK/NACK to the first transmission and a second ACK/NACK to the second transmission in a third subframe delayed from the first subframe based on the delay period. In an aspect, the first transmission and/or the second transmission may include two or more segments. In such aspect, the eNB may concurrently send two or more ACKs/NACKs corresponding to the two or more segments of the first transmission and/or two or more ACKs/NACKs corresponding to the two or more segments of the second transmission in the third subframe.

For example, with reference to FIG. 9A, the eNB 1002 may receive a first transmission ("Rx1") in subframe 0 ("SF0") and a second transmission ("Rx2") in subframe 1 ("SF1"). The eNB 1002 may then send concurrently to the UE 1004 a first ACK/NACK ("ACK1") to the first transmission and a second ACK/NACK ("ACK2") to the second transmission in a subframe that is delayed from the subframe in which the first transmission was received based on the delay period. For example, in FIG. 9A, if the delay period is six subframes with respect to the subframe in which the first transmission was received, the eNB 1002 sends ACK1 and ACK2 in subframe 6 ("SF6").

At step 1228, the eNB sends to the at least one UE a first ACK/NACK to the first transmission in a third subframe delayed from the first subframe based on the delay period. In an aspect, the first transmission may include two or more segments. In such aspect, the eNB may send two or more ACKs/NACKs corresponding to the two or more segments of the first transmission in the third subframe.

At step 1230, the eNB sends to the at least one UE a second ACK/NACK to the second transmission in a fourth subframe delayed from the second subframe based on the delay period. In an aspect, the second transmission may include two or more segments. In such aspect, the eNB may send two or more ACKs/NACKs corresponding to the two or more segments of the second transmission in the fourth subframe.

For example, with reference to FIG. 9B, the eNB 1002 may receive a first transmission ("Rx1") in subframe 0 ("SF0") and a second transmission ("Rx2") in subframe 1 ("SF1"). The eNB may send a first ACK/NACK ("ACK1") to the first transmission in a subframe delayed from SF0 based on a delay period. The eNB 1002 may then send a second ACK/NACK ("ACK2") to the second transmission in a subframe delayed from SF1 based on the delay period. For example, in FIG. 9B, if the delay period is six subframes, the eNB 1002 sends ACK1 in SF6 and ACK2 in subframe 7 ("SF7").

At step 1232, the eNB sends to the at least one UE a combined ACK/NACK for both the first transmission and the second transmission in a third subframe delayed from the first subframe based on the delay period. For example, the eNB may send a single ACK in the third subframe that acknowledges both the first transmission and the second transmission.

For example, with reference to FIG. 9C, the eNB 1002 may receive a first transmission ("Rx1") in subframe 0 ("SF0") and a second transmission ("Rx2") in subframe 1 ("SF1"). The eNB 1002 may then send a combined ACK/NACK ("ACK1,2") for both the first transmission and the second transmission in a subframe that is delayed from the subframe in which the first transmission was received based on the delay period. For example, in FIG. 9C, if the delay period is six subframes with respect to the subframe in which the first transmission was received, the eNB 1002 sends ACK1,2 in SF6.

At step 1234, the eNB sends to the at least one UE ACKs/NACKs for only a subset of the transmitted UL transmissions based on the indication of the one or more of the received UL transmissions that are to be acknowledged.

For example, with reference to FIG. 9D, the eNB 1002 may receive a first transmission ("Rx1") in subframe 0 ("SF0") and a second transmission ("Rx2") in subframe 1 ("SF1"). The eNB 1002 may send an ACK/NACK ("ACK2") for only a subset of the transmissions from the UE 1004 based on the indication of the one or more of the transmissions from the UE 1004 that are to be acknowledged. For example, if the indication requires the eNB 1002 to send an ACK/NACK for every second transmission from the UE 1004 (i.e., every other transmission) in a sequence of transmissions from the UE 1004, the eNB 1002 may send ACK2 in subframe 5 ("SF5") only for the second transmission that was received by the eNB 1002 in SF1. As shown in FIG. 9D, the eNB 1002 may send ACK2 four subframes after SF1 in which the second transmission was received by the eNB 1002.

Figure 13:
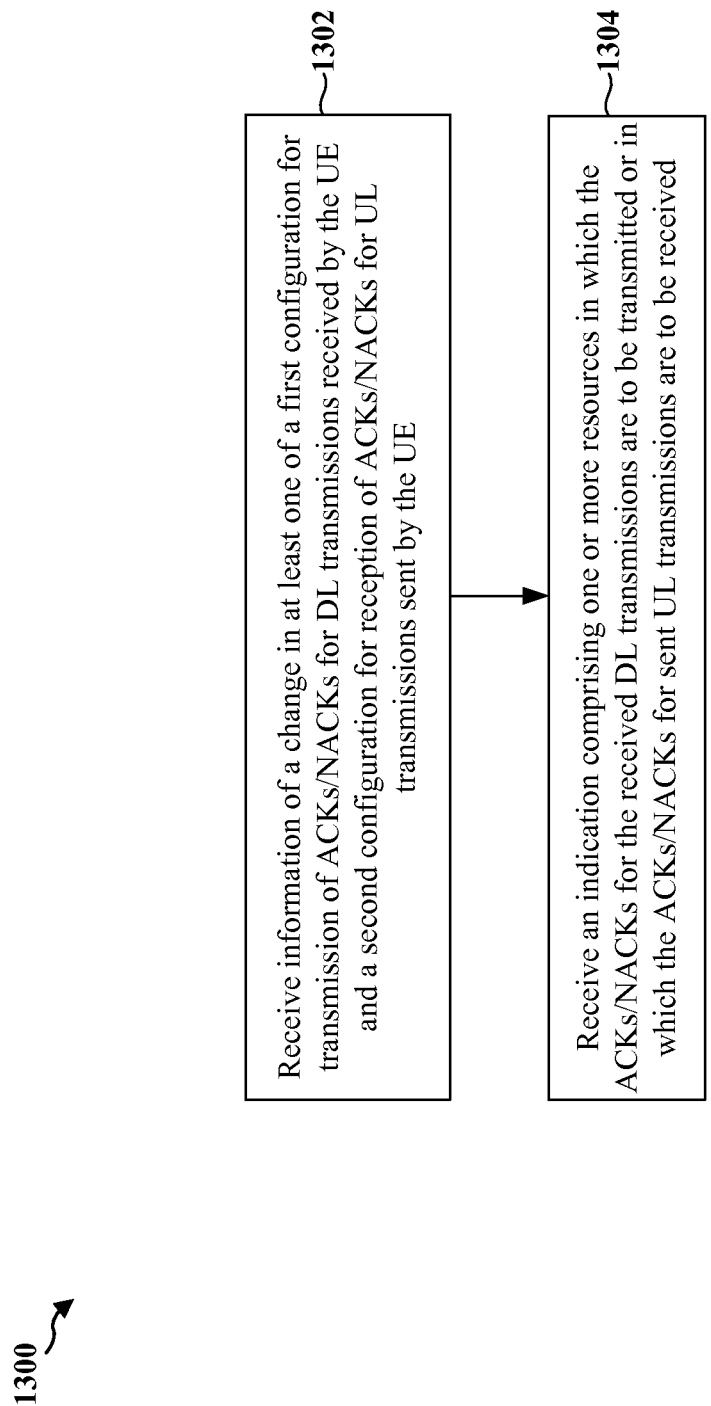
FIG. 13 is a flow chart of a method of wireless communication.

FIG. 13 is a flow chart 1300 of a method of wireless communication. The method may be performed by a UE. At step 1302, the UE receives information of a change in a first configuration for transmission of ACKs/NACKs for DL transmissions received by the UE and/or a second configuration for reception of ACKs/NACKs for UL transmissions sent by the UE. For example, the UE may be in a subset of RRC connected UEs. In one aspect, the UE may receive the information through an RRC configuration message.

At step 1304, the UE receives an indication including one or more resources in which the ACKs/NACKs for the received DL transmissions are to be transmitted or in which the ACKs/NACKs for sent UL transmissions are to be received. For example, the one or more resources may be subframes in which ACKs/NACKs are to be transmitted or received. In an aspect, the indication may include a first set of resources that are to be used by the UE when transmitting the ACKs/NACKs for the received DL transmissions and/or a second set of resources that are to be used by the UE when receiving the ACKs/NACKs for sent UL transmissions. In one configuration, the indication of the first set of resources or the second set of resources may be an explicit indication. For example, the explicit indication may identify specific subframes in which the UE may transmit or receive ACKs/

NACKs. In another configuration, the indication of the first set of resources or the second set of resources may be an implicit indication. In such a configuration, the implicit indication may be based on a function of an identity of the UE, an index of a resource of a DL transmission, and/or a delay associated with transmission of the ACKs/NACKs for the received DL transmissions. For example, a UE transmitting ACKs/NACKs after an $n^{th}$ subframe may be required to transmit in an $n^{th}$ PUCCH.

Figure 14A:
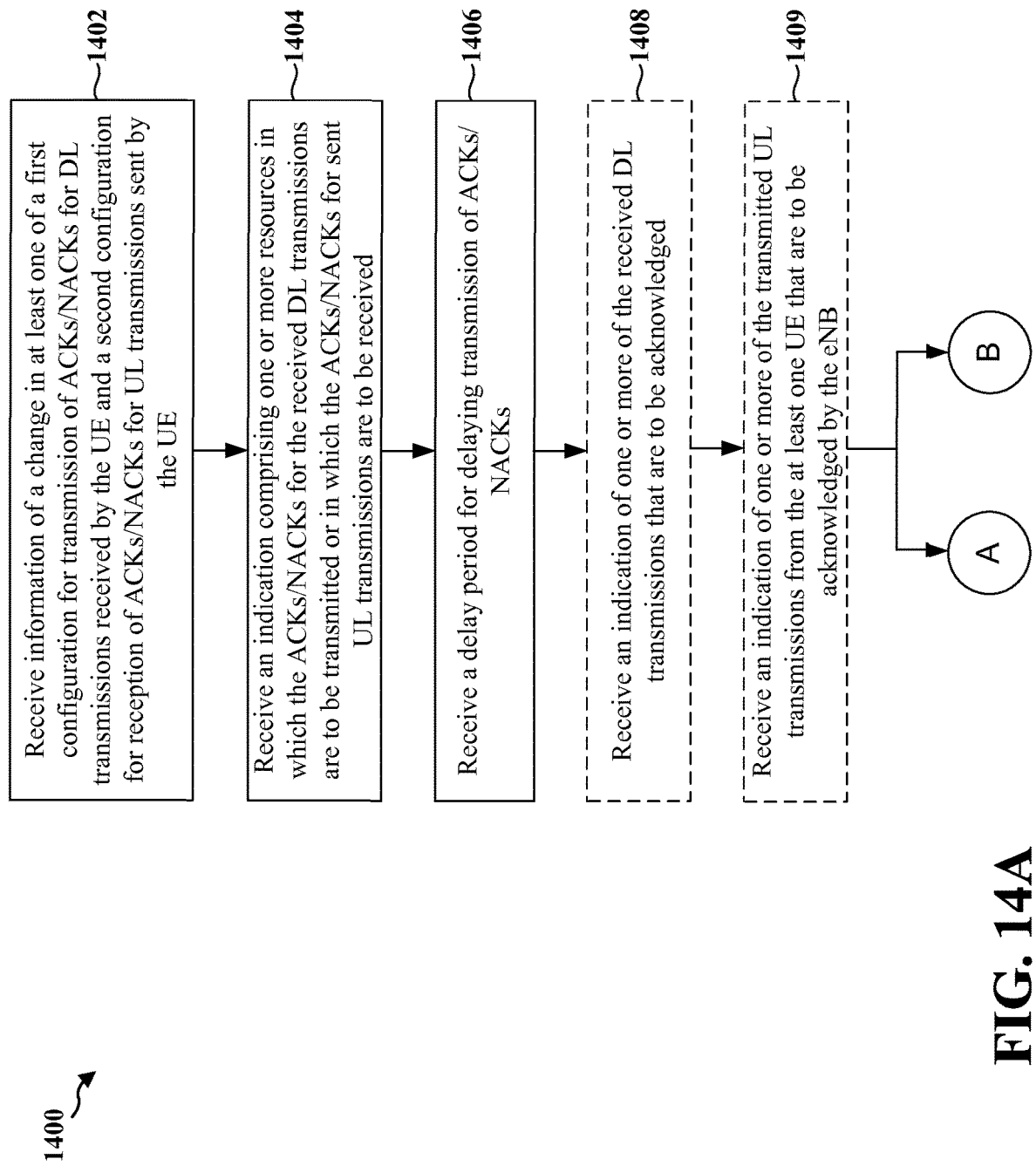
FIGS. 14A, 14B, and 14C are a flow chart of a method of wireless communication.
Figure 14B:
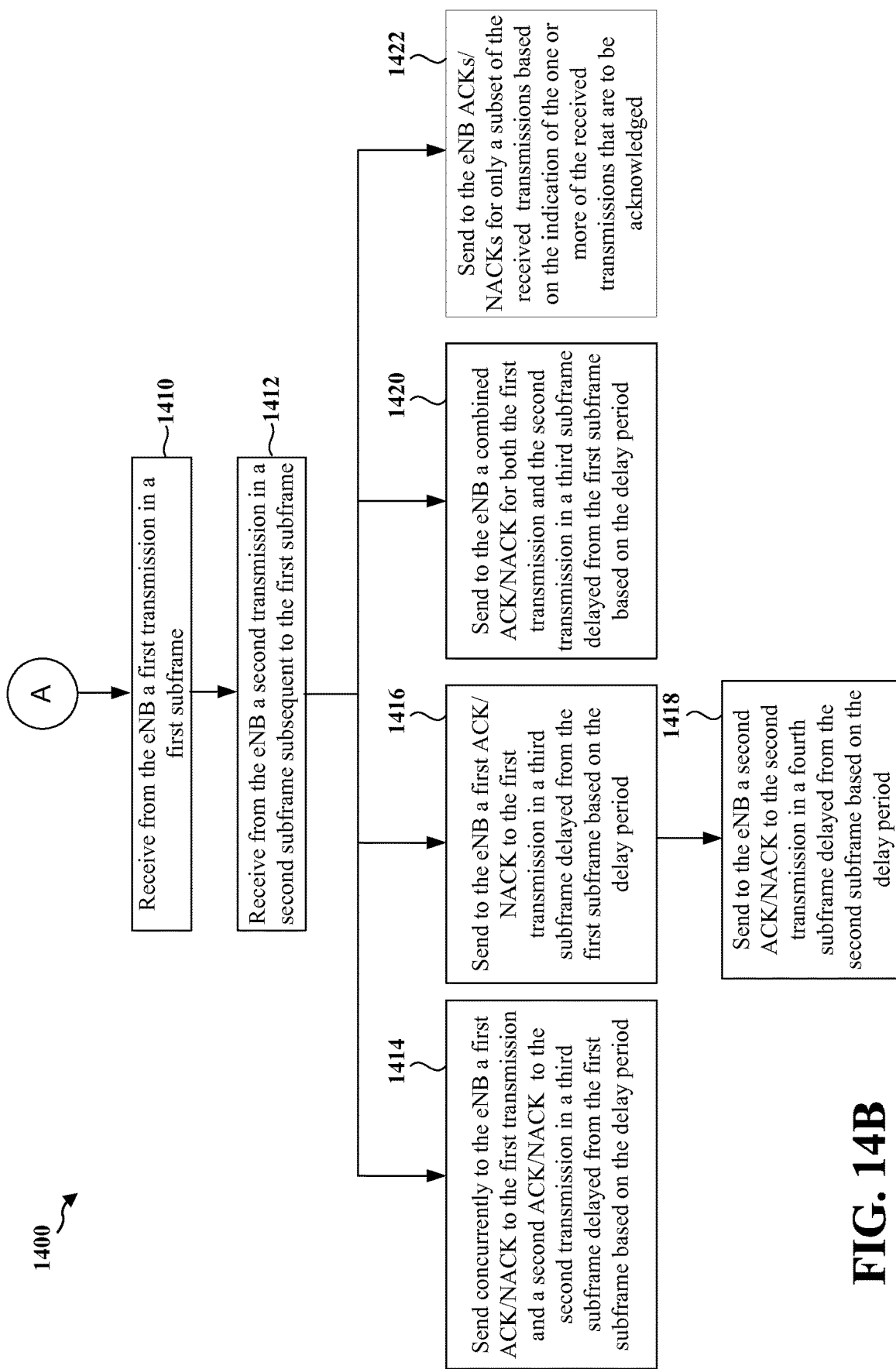
Figure 14C:
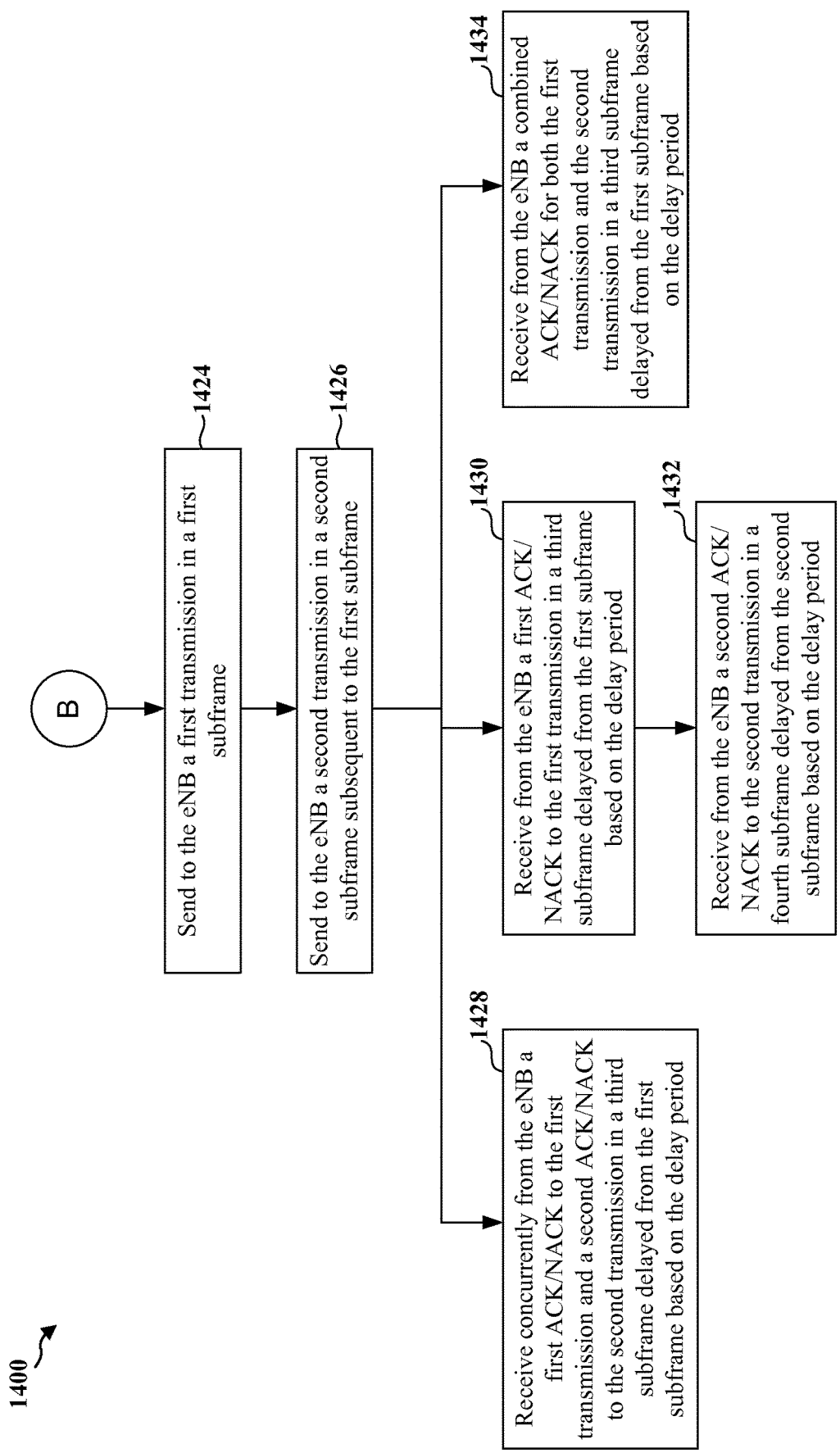

FIGS. 14A, 14B, and 14C are a flow chart 1400 of a method of wireless communication. The method may be performed by a UE. At step 1402, the UE receives information of a change in a first configuration for transmission of ACKs/NACKs for DL transmissions received by the UE and/or a second configuration for reception of ACKs/NACKs for UL transmissions sent by the UE. For example, the UE may be in a subset of RRC connected UEs. In one aspect, the UE may receive the information through an RRC configuration message.

At step 1404, the UE receives an indication including one or more resources in which the ACKs/NACKs for the received DL transmissions are to be transmitted or in which the ACKs/NACKs for sent UL transmissions are to be received. For example, the one or more resources may be subframes in which ACKs/NACKs are to be transmitted or received. In one aspect, the indication may include a first set of resources that are to be used by the UE when transmitting the ACKs/NACKs for the received DL transmissions and/or a second set of resources that are to be used by the UE when receiving the ACKs/NACKs for sent UL transmissions. In one configuration, the indication of the first set of resources or the second set of resources may be an explicit indication. For example, the explicit indication may identify specific subframes in which the UE may transmit or receive ACKs/NACKs. In another configuration, the indication of the first set of resources or the second set of resources may an implicit indication. In such a configuration, the implicit indication may be based on a function of an identity of the UE, an index of a resource of a DL transmission, and/or a delay associated with transmission of the ACKs/NACKs for the received DL transmissions. For example, a UE transmitting ACKs/NACKs after an $n^{th}$ subframe may be required to transmit in an $n^{th}$ PUCCH.

At step 1406, the UE receives a delay period for delaying transmission of ACKs/NACKs. For example, the delay period may be six subframes or 6.0 ms.

At step 1408, the UE receives an indication of one or more of the received DL transmissions that are to be acknowledged. In one aspect, the indication indicates that the UE is to send ACKs/NACKs for only a subset of the received DL transmissions. For example, the subset of the received DL transmissions may include every third transmission, such that the UE sends an ACK/NACK only for every third transmission in a sequence of transmissions. As another example, the subset of the received DL transmissions may include all transmissions except for transmissions indicated as including new data.

At step 1409, the UE receives an indication from the eNB of one or more of the transmitted UL transmissions from the UE that are to be acknowledged by the eNB. In an aspect, the indication of the one or more of the transmitted UL transmissions that are to be acknowledged by the eNB is used to configure the at least one UE to receive the ACKs/NACKs for only a subset of the transmitted UL transmissions. For example, the subset of the transmitted UL transmissions may include every third transmission, such that the UE is configured to receive an ACK/NACK only for every third transmission in a sequence of transmissions. As another example, the subset of the transmitted UL transmissions may include all transmissions except for transmissions indicated as including new data.

Referring now to FIG. 14B, at step 1410, the UE receives from the eNB a first transmission in a first subframe. For example, the first transmission may be a data transmission.

At step 1412, the UE receives from the eNB a second transmission in a second subframe subsequent to the first subframe. For example, the second transmission may be a data transmission.

At step 1414, the UE may send concurrently to the eNB a first ACK/NACK to the first transmission and a second ACK/NACK to the second transmission in a third subframe delayed from the first subframe based on the delay period. In an aspect, the first transmission and/or the second transmission may include two or more segments. In such aspect, the UE may concurrently send two or more ACKs/NACKs corresponding to the two or more segments of the first transmission and/or two or more ACKs/NACKs corresponding to the two or more segments of the second transmission in the third subframe.

For example, with reference to FIG. 9A, the UE 704 may receive a first transmission ("Rx1") in subframe 0 ("SF0") and a second transmission ("Rx2") in subframe 1 ("SF1"). The UE 704 may then send concurrently a first ACK/NACK ("ACK1") to the first transmission and a second ACK/NACK ("ACK2") to the second transmission in a subframe that is delayed from the subframe in which the first transmission was received based on the delay period. For example, in FIG. 9A, if the delay period is six subframes with respect to the subframe in which the first transmission was received, the UE 704 sends ACK1 and ACK2 in subframe 6 ("SF6").

At step 1416, the UE sends to the eNB a first ACK/NACK to the first transmission in a third subframe delayed from the first subframe based on the delay period. In an aspect, the first transmission may include two or more segments. In such aspect, the UE may send two or more ACKs/NACKs corresponding to the two or more segments of the first transmission in the third subframe.

At step 1418, the UE sends to the eNB a second ACK/NACK to the second transmission in a fourth subframe delayed from the second subframe based on the delay period. In an aspect, the second transmission may include two or more segments. In such aspect, the UE may send two or more ACKs/NACKs corresponding to the two or more segments of the second transmission in the fourth subframe.

For example, with reference to FIG. 9B, the UE 704 may receive a first transmission ("Rx1") in subframe 0 ("SF0") and a second transmission ("Rx2") in subframe 1 ("SF1"). The UE 704 may send a first ACK/NACK ("ACK1") to the first transmission in a subframe delayed from SF0 based on a delay period. The UE 704 may then send a second ACK/NACK ("ACK2") to the second transmission in a subframe delayed from SF1 based on the delay period. For example, in FIG. 9B, if the delay period is six subframes, the UE 704 sends ACK1 in SF6 and ACK2 in subframe 7 ("SF7").

At step 1420, the UE sends to the eNB a combined ACK/NACK for both the first transmission and the second transmission in a third subframe delayed from the first subframe based on the delay period. For example, the UE may send a single ACK in the third subframe that acknowledges both the first transmission and the second transmission.

For example, with reference to FIG. 9C, the UE 704 may receive a first transmission ("Rx1") in subframe 0 ("SF0") and a second transmission ("Rx2") in subframe 1 ("SF1"). The UE may then send a combined ACK/NACK ("ACK1, 2") for both the first transmission and the second transmission in a subframe that is delayed from the subframe in which the first transmission was received based on the delay period. For example, in FIG. 9C, if the delay period is six subframes with respect to the subframe in which the first transmission was received, the UE 704 sends ACK1,2 in SF6.

At step 1422, the UE sends to the eNB ACKs/NACKs for only a subset of the received DL transmissions based on the indication of the one or more of the received DL transmissions that are to be acknowledged.

For example, with reference to FIG. 9D, the UE 704 may receive a first transmission ("Rx1") in subframe 0 ("SF0") and a second transmission ("Rx2") in subframe 1 ("SF1"). The UE 704 may send an ACK/NACK ("ACK2") for only a subset of the received transmissions based on the indication of the one or more of the received transmissions that are to be acknowledged. For example, if the indication requires the UE 704 to send an ACK/NACK for every second transmission (i.e., every other transmission) in a sequence of transmissions received by the UE 704, the UE 704 may send ACK2 in subframe 5 ("SF5") only for the second transmission that was received in SF1. As shown in FIG. 9D, the UE 704 may send ACK2 four subframes after SF1 in which the second transmission was received by the UE 704.

Referring now to FIG. 14C, at step 1424, the UE sends to the eNB a first transmission in a first subframe. For example, the first transmission may be a data transmission.

At step 1426, the UE sends to the eNB a second transmission in a second subframe subsequent to the first subframe. For example, the second transmission may be a data transmission.

At step 1428, the UE receives concurrently from the eNB a first ACK/NACK to the first transmission and a second ACK/NACK to the second transmission in a third subframe delayed from the first subframe based on the delay period. For example, with reference to FIG. 8A in which the first transmission ("Tx1") is sent by the UE 1004 in SF0 and the second transmission ("Tx2") is sent by the UE 1004 in SF1, the UE 1004 receives ACK1 and ACK2 in subframe 6 ("SF6") if the delay period is six subframes with respect to the subframe in which the first transmission was sent. In an aspect, the first transmission and/or the second transmission may include two or more segments. In such aspect, the UE 1004 may receive two or more ACKs/NACKs corresponding to the two or more segments of the first transmission and/or two or more ACKs/NACKs corresponding to the two or more segments of the second transmission in the third subframe.

At step 1430, the UE receives from the eNB a first ACK/NACK to the first transmission in a third subframe delayed from the first subframe based on the delay period. In an aspect, the first transmission may include two or more segments. In such aspect, the UE may receive two or more ACKs/NACKs corresponding to the two or more segments of the first transmission in the third subframe.

At step 1432, the UE receives from the eNB a second ACK/NACK to the second transmission in a fourth subframe delayed from the second subframe based on the delay period. In an aspect, the second transmission may include two or more segments. In such aspect, the UE may receive two or more ACKs/NACKs corresponding to the two or more segments of the second transmission in the fourth subframe.

For example, with reference to FIG. 8B, the UE 1004 may send to the eNB 1002 a first transmission ("Tx1") in subframe 0 ("SF0") and a second transmission ("Tx2") in subframe 1 ("SF1"). The UE 1004 may receive from the eNB 1002 a first ACK/NACK ("ACK1") to the first transmission in a subframe delayed from SF0 based on the delay period. The UE 1004 may then receive a second ACK/NACK ("ACK2") to the second transmission in a subframe delayed from SF1 based on the delay period. For example, in FIG. 8B, if the delay period is six subframes, the UE 1004 receives ACK1 in SF6 and ACK2 in subframe 7 ("SF7").

At step 1434 the UE receives from the eNB a combined ACK/NACK for both the first transmission and the second transmission in a third subframe delayed from the first subframe based on the delay period. For example, the UE may receive a single ACK in the third subframe that acknowledges both the first transmission and the second transmission.

For example, with reference to FIG. 8C, the UE 1004 may send a first transmission ("Tx1") in subframe 0 ("SF0") and a second transmission ("Tx2") in subframe 1 ("SF1"). The UE 1004 may then receive a combined ACK/NACK ("ACK1,2") for both the first transmission and the second transmission in a subframe that is delayed from the subframe in which the first transmission was sent based on the delay period. For example, in FIG. 8C, if the delay period is six subframes with respect to the subframe in which the first transmission was sent, the UE 1004 receives ACK1,2 in SF6.

Figure 15:
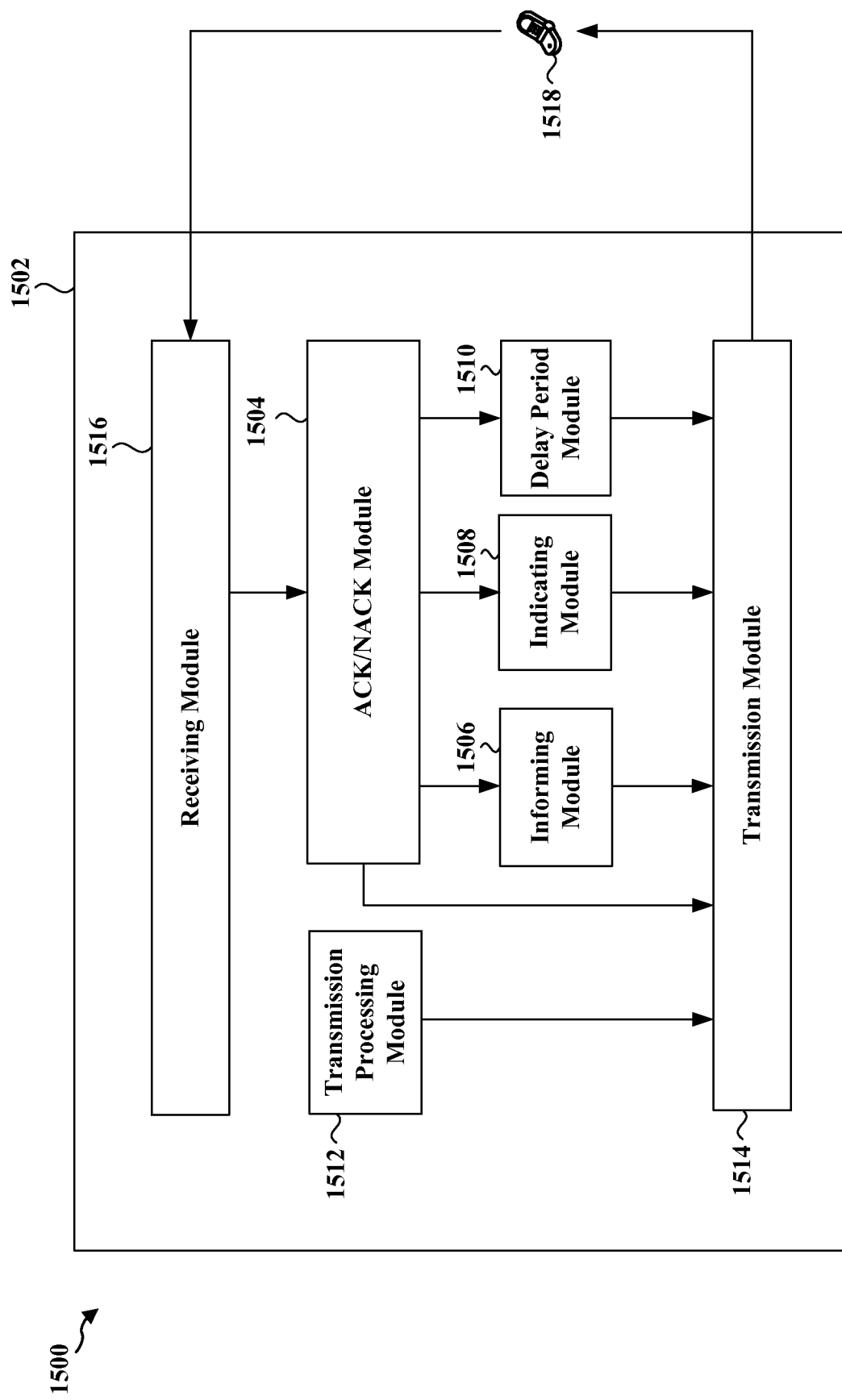
FIG. 15 is a conceptual data flow diagram illustrating the data flow between different modules/means/components in an exemplary apparatus.

FIG. 15 is a conceptual data flow diagram 1500 illustrating the data flow between different modules/means/components in an exemplary apparatus 1502. The apparatus 1502 may be an eNB. The eNB includes an ACK/NACK module 1504, an informing module 1506, an indicating module 1508, a delay period module 1510, a transmission processing module 1512, a transmission module 1514, and a receiving module 1516.

The ACK/NACK module 1504 receives and processes ACKs/NACKs from the UE 1518. The ACK/NACK module 1504 changes a first configuration for transmission of ACKs/NACKs by the UE 1518 for DL transmissions received by the UE 1518 and/or a second configuration for reception of ACKs/NACKs by the UE 1518 for UL transmissions sent by the UE 1518. In one aspect, the ACK/NACK module 1504 may send concurrently to the UE 1518 a first ACK/NACK to a first transmission from the UE and a second ACK/NACK to a second transmission from the UE 1518 in a third subframe delayed from the first subframe based on the delay period. In another aspect, the ACK/NACK module 1504 may send to the UE 1518 a first ACK/NACK to a first transmission in a third subframe delayed from the first subframe based on the delay period. In an aspect, the first transmission may include two or more segments. The ACK/NACK module 1504 may further send a second ACK/NACK to the second transmission in a fourth subframe delayed from the second subframe based on the delay period. In another aspect, the ACK/NACK module 1504 may send a combined ACK/NACK for both a first transmission and a second transmission from the UE 1518 in a third subframe delayed from the first subframe based on the delay period. In another aspect, the ACK/NACK module 1504 may send to the UE 1518 ACKs/NACKs for only a subset of the transmitted UL transmissions based on the indication of the one or more of the received UL transmissions that are to be acknowledged.

The informing module 1506 informs the UE 1518 of a change in a first configuration for transmission of ACKs/NACKs by the UE 1518 for DL transmissions received by the UE 1518 and/or a second configuration for reception of ACKs/NACKs by the UE 1518 for UL transmissions sent by the UE 1518. In an aspect, the eNB may inform the UE 1518 through an RRC configuration message, which may be transmitted to the UE 1518 via the transmission module 1514.

The indicating module 1508 may indicate to the UE 1518 one or more resources in which the UE 1518 is to transmit the ACKs/NACKs for the received DL transmissions or is to receive the ACKs/NACKs for sent UL transmissions. In an aspect, the indicating module 1508 indicates to the UE 1518 one or more of the received DL transmissions that are to be acknowledged by the UE 1518. The indicating module 1508 may indicates to the UE one or more of the transmitted UL transmissions from the at least one UE that are to be acknowledged by the eNB.

The delay period module 1510 sends a delay period to the UE 1518 via the transmission module 1514. The delay period may be used by the UE 1518 for delaying the transmission of ACKs/NACKs.

The transmission processing module 1512 generates first and second transmissions. For example, the first and second transmissions may be data transmissions. The transmission processing module 1512 sends the first transmission to the UE 1518 via the transmission module 1514 in a first subframe and sends the second transmission to the UE 1518 via the transmission module 1514 in a second subframe subsequent to the first subframe.

The receiving module 1516 receives ACKs/NACKs transmitted from the UE 1518. The ACKs/NACKs may be transmitted from the UE 1518 in response to DL transmissions from the eNB. In an aspect, the receiving module 1516 receives concurrently a first ACK/NACK to the first transmission and a second ACK/NACK to the second transmission in a third subframe delayed from the first subframe based on the delay period. In another aspect, the receiving module 1516 receives a first ACK/NACK to the first transmission in a third subframe delayed from the first subframe based on the delay period and receives a second ACK/NACK to the second transmission in a fourth subframe delayed from the second subframe based on the delay period. In another aspect, the receiving module 1516 receives a combined ACK/NACK for both the first transmission and the second transmission in a third subframe delayed from the first subframe based on the delay period. The receiving module 1516 receives from the UE a first transmission in a first subframe and receives a second transmission from the UE in a second subframe subsequent to the first subframe.

The apparatus may include additional modules that perform each of the steps of the algorithm in the aforementioned flow charts of FIGS. 11, 12A, 12B, and 12C. As such, each step in the aforementioned flow charts of FIGS. 11, 12A, 12B, and 12C may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 16:
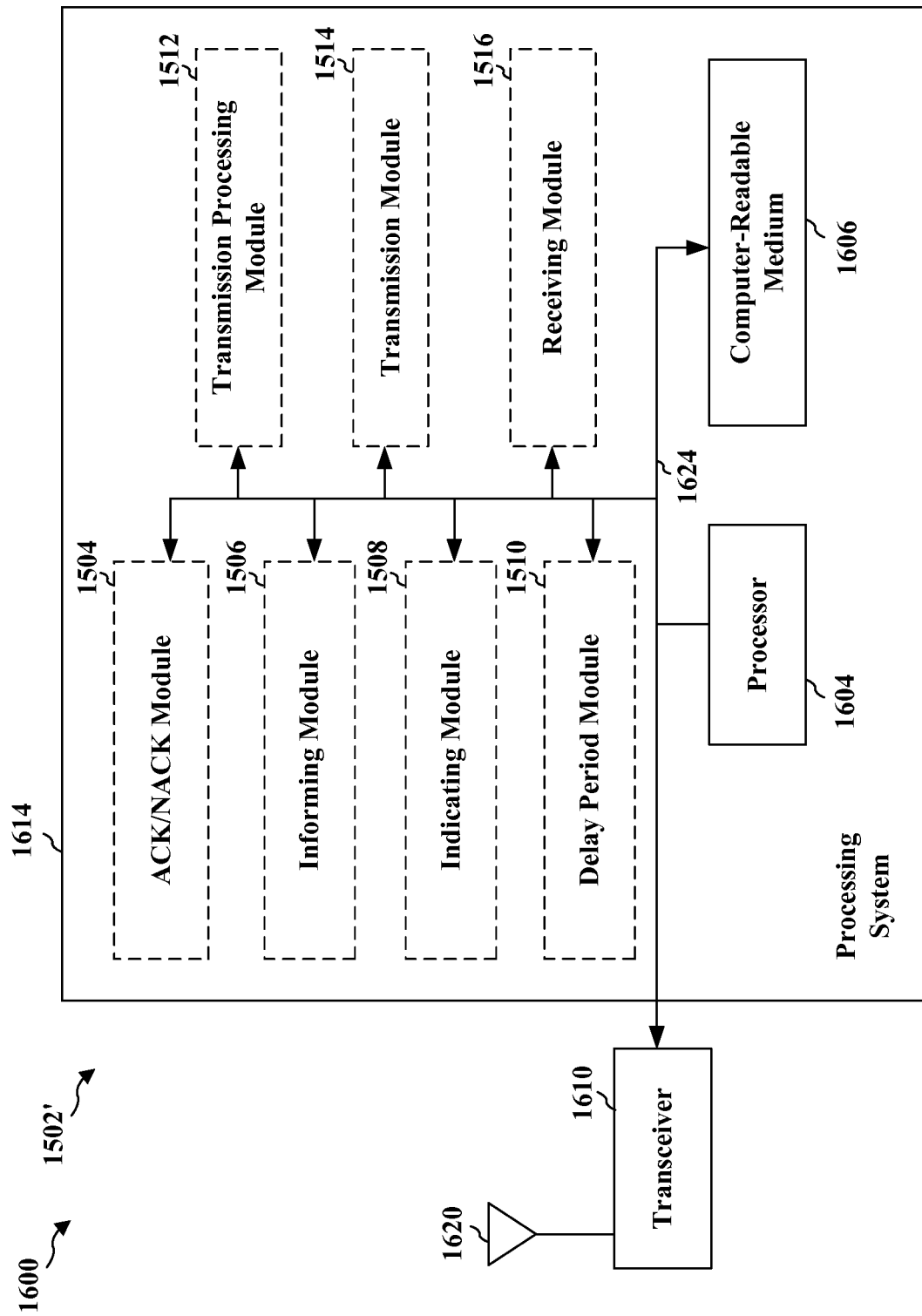
FIG. 16 is a diagram illustrating an example of a hardware implementation for an apparatus employing a processing system.

FIG. 16 is a diagram 1600 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware modules, represented by the processor 1604, the modules 1504, 1506, 1508, 1510, 1512, 1514, and 1516, and the computer-readable medium 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The transceiver 1610 receives a signal from the one or more antennas 1620, extracts information from the received signal, and provides the extracted information to the processing system 1614, specifically the receiving module 1516. In addition, the transceiver 1610 receives information from the processing system 1614, specifically the transmission module 1514, and based on the received information, generates a signal to be applied to the one or more antennas 1620. The processing system 1614 includes a processor 1604 coupled to a computer-readable medium 1606. The processor 1604 is responsible for general processing, including the execution of software stored on the computer-readable medium 1606. The software, when executed by the processor 1604, causes the processing system 1614 to perform the various functions described supra for any particular apparatus. The computer-readable medium 1606 may also be used for storing data that is manipulated by the processor 1604 when executing software. The processing system further includes at least one of the modules 1504, 1506, 1508, 1510, 1512, 1514, and 1516. The modules may be software modules running in the processor 1604, resident/stored in the computer readable medium 1606, one or more hardware modules coupled to the processor 1604, or some combination thereof. The processing system 1614 may be a component of the eNB 610 and may include the memory 676 and/or at least one of the TX processor 616, the RX processor 670, and the controller/processor 675.

In one configuration, the apparatus 1502/1502' for wireless communication includes means for informing at least one UE of a change in a first configuration for transmission of ACKs/NACKs by the at least one UE for DL transmissions received by the at least one UE and/or a second configuration for reception of ACKs/NACKs by the at least one UE for UL transmissions sent by the at least one UE, means for indicating to the at least one UE one or more resources in which the at least one UE is to transmit the ACKs/NACKs for the received DL transmissions or is to receive the ACKs/NACKs for sent UL transmissions, means for sending a delay period to the at least one UE for delaying transmission of ACKs/NACKs, means for sending to the at least one UE a first transmission in a first subframe, means for sending to the at least one UE a second transmission in a second subframe subsequent to the first subframe, means for receiving from the at least one UE a first transmission in a first subframe, means for receiving from the at least one UE a second transmission in a second subframe subsequent to the first subframe, means for receiving concurrently from the at least one UE a first ACK/NACK to the first transmission and a second ACK/NACK to the second transmission in a third subframe delayed from the first subframe based on the delay period, means for sending concurrently to the at least one UE a first ACK/NACK to the received first transmission and a second ACK/NACK to the received second transmission in a third subframe delayed from the first subframe based on the delay period, means for sending to the at least one UE a first ACK/NACK to the first transmission in a third subframe delayed from the first subframe based on the delay period, means for sending to the at least one UE a second ACK/NACK to the second transmission in a fourth subframe delayed from the second subframe based on the delay period, means for receiving from the at least one UE a first ACK/NACK to the first transmission in a third subframe delayed from the first subframe based on the delay period, means for receiving from the at least one UE a second ACK/NACK to the second transmission in a fourth subframe delayed from the second subframe based on the delay period, means for receiving a combined ACK/NACK for both the first transmission and the second transmission in a third subframe delayed from the first subframe based on the delay period, means for sending to the at least one UE a combined ACK/NACK for both the first transmission and the second transmission in a third subframe delayed from the first subframe based on the delay period, means for indicating to the at least one UE one or more of the received DL transmissions that are to be acknowledged by the at least one UE, and means for indicating to the at least one UE one or more of the transmitted UL transmissions by the at least one UE that are to be acknowledged by the eNB. The aforementioned means may be one or more of the aforementioned modules of the apparatus 1502 and/or the processing system 1614 of the apparatus 1502' configured to perform the functions recited by the aforementioned means. As described supra, the processing system 1614 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

Figure 17:
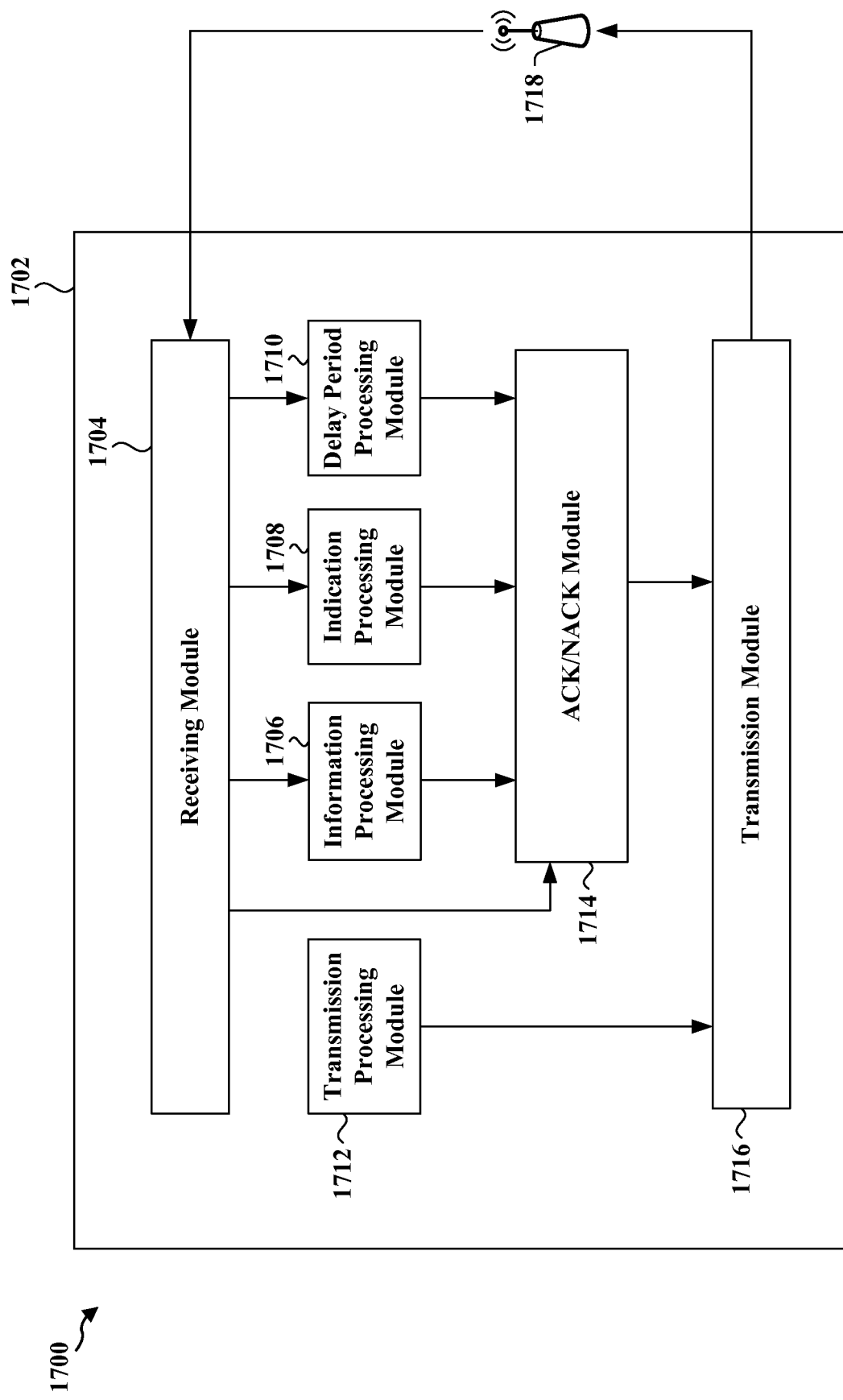
FIG. 17 is a conceptual data flow diagram illustrating the data flow between different modules/means/components in an exemplary apparatus.

FIG. 17 is a conceptual data flow diagram 1700 illustrating the data flow between different modules/means/components in an exemplary apparatus 1702. The apparatus 1702 may be a UE. The UE includes a receiving module 1704, an information processing module 1706, an indication processing module 1708, a delay period processing module 1710, a transmission processing module 1712, an ACK/NACK module 1714, and a transmission module 1716.

The receiving module 1704 receives first and second transmissions from the eNB 1718. For example, the first and second transmissions may be data transmissions. The receiving module 1704 receives the first transmission from the eNB 1718 in a first subframe and receives the second transmission from the eNB 1718 in a second subframe subsequent to the first subframe.

The information processing module 1706 receives information from the eNB 1718 via the receiving module 1704 of a change in a first configuration for transmission of ACKs/NACKs by the UE for DL transmissions received by the UE and/or a second configuration for reception of ACKs/NACKs by the UE for UL transmissions sent by the UE. In an aspect, the eNB 1718 may inform the UE through an RRC configuration message, which may be received by the UE via the receiving module 1704.

The indication processing module 1708 receives an indication from the eNB 1718 via the receiving module 1704, the indication including one or more resources in which the ACKs/NACKs for the received DL transmissions are to be transmitted or in which the ACKs/NACKs for sent UL transmissions are to be received. In an aspect, the indication processing module 1708 receives an indication of one or more of the received DL transmissions that are to be acknowledged by the UE. In another aspect, the indication processing module 1708 may receive an indication of one or more of the transmitted UL transmissions from the at least one UE that are to be acknowledged by the eNB.

The delay period processing module 1710 receives a delay period from the eNB 1718 via the receiving module 1704. The delay period may be used by the UE for delaying the transmission of ACKs/NACKs.

The transmission processing module 1712 generates first and second transmissions. For example, the first and second transmissions may be data transmissions. The transmission processing module 1712 sends the first transmission to the eNB 1718 via the transmission module 1716 in a first subframe and sends the second transmission to the eNB 1718 via the transmission module 1716 in a second subframe subsequent to the first subframe.

The ACK/NACK module 1714 applies a change to a first configuration for transmission of ACKs/NACKs for DL transmissions received by the UE and/or a second configuration for reception of ACKs/NACKs for UL transmissions sent by the UE. In one aspect, the ACK/NACK module 1714 generates and sends ACKs/NACKs to the eNB 1718 via the transmission module 1716. The ACKs/NACKs may be transmitted from the UE to the eNB 1718 in response to DL transmissions from the eNB 1718. In an aspect, the ACK/NACK module 1714 sends concurrently a first ACK/NACK to a first transmission from the eNB 1718 and a second ACK/NACK to a second transmission from the eNB 1718 in a third subframe delayed from the first subframe based on the delay period. In another aspect, the ACK/NACK module 1714 sends a first ACK/NACK to the first transmission in a third subframe delayed from the first subframe based on the delay period and sends a second ACK/NACK to the second transmission in a fourth subframe delayed from the second subframe based on the delay period. In another aspect, the ACK/NACK module 1714 sends a combined ACK/NACK for both the first transmission and the second transmission in a third subframe delayed from the first subframe based on the delay period. In another aspect, the ACK/NACK module 1714 sends ACKs/NACKs for only a subset of the received transmissions based on the indication of the one or more of the received transmissions (e.g., the first transmission and/or the second transmission from the eNB 1718) that are to be acknowledged.

In an aspect, the ACK/NACK module 1714 receives concurrently from the eNB 1718 a first ACK/NACK to a first transmission and a second ACK/NACK to a second transmission in a third subframe delayed from the first subframe based on the delay period. In another aspect, the ACK/NACK module 1714 receives from the eNB 1718 a first ACK/NACK to a first transmission in a third subframe delayed from the first subframe based on the delay period. The ACK/NACK module 1714 further receives from the eNB 1718 a second ACK/NACK to a second transmission in a fourth subframe delayed from the second subframe based on the delay period.

In another aspect, the ACK/NACK module 1714 receives from the eNB 1718 a combined ACK/NACK for both a first transmission and a second transmission in a third subframe delayed from the first subframe based on the delay period.

The apparatus may include additional modules that perform each of the steps of the algorithm in the aforementioned flow charts of FIGS. 13, 14A, 14B, and 14C. As such, each step in the aforementioned flow charts of FIGS. 13, 14A, 14B, and 14C may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 18:
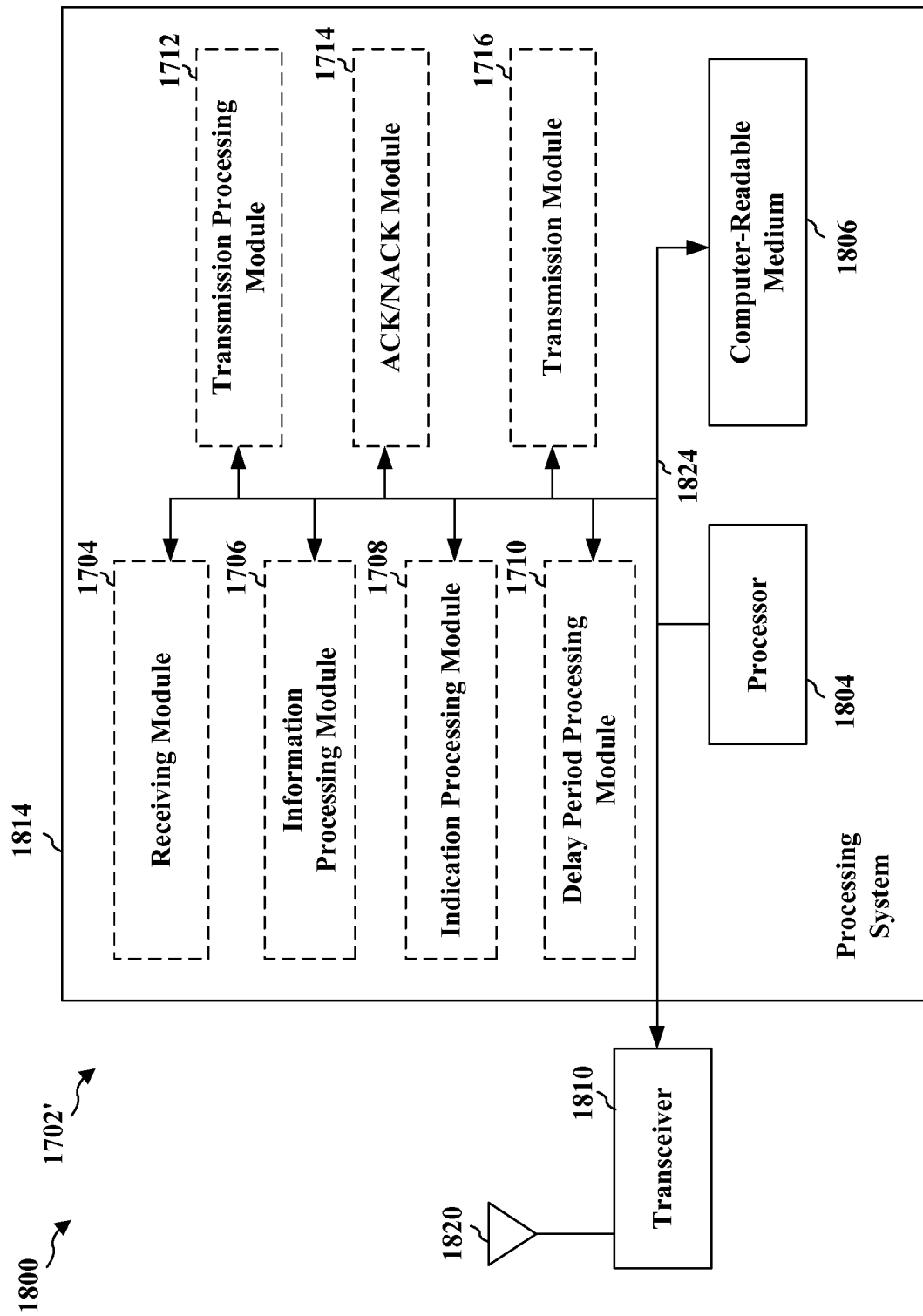
FIG. 18 is a diagram illustrating an example of a hardware implementation for an apparatus employing a processing system.

FIG. 18 is a diagram 1800 illustrating an example of a hardware implementation for an apparatus 1702' employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors and/or hardware modules, represented by the processor 1804, the modules 1704, 1706, 1708, 1710, 1712, 1714, and 1716, and the computer-readable medium 1806. The bus 1824 may also link various other circuits such as timing sources, peripherals, voltage regulators, and power management circuits, which are well known in the art, and therefore, will not be described any further.

The processing system 1814 may be coupled to a transceiver 1810. The transceiver 1810 is coupled to one or more antennas 1820. The transceiver 1810 provides a means for communicating with various other apparatus over a transmission medium. The transceiver 1810 receives a signal from the one or more antennas 1820, extracts information from the received signal, and provides the extracted information to the processing system 1814, specifically the receiving module 1704. In addition, the transceiver 1810 receives information from the processing system 1814, specifically the transmission module 1716, and based on the received information, generates a signal to be applied to the one or more antennas 1820. The processing system 1814 includes a processor 1804 coupled to a computer-readable medium 1806. The processor 1804 is responsible for general processing, including the execution of software stored on the computer-readable medium 1806. The software, when executed by the processor 1804, causes the processing system 1814 to perform the various functions described supra for any particular apparatus. The computer-readable medium 1806 may also be used for storing data that is manipulated by the processor 1804 when executing software. The processing system further includes at least one of the modules 1704, 1706, 1708, 1710, 1712, 1714, and 1716. The modules may be software modules running in the processor 1804, resident/stored in the computer readable medium 1806, one or more hardware modules coupled to the processor 1804, or some combination thereof. The processing system 1814 may be a component of the UE 650 and may include the memory 660 and/or at least one of the TX processor 668, the RX processor 656, and the controller/processor 659.

In one configuration, the apparatus 1702/1702' for wireless communication includes means for receiving information of a change in a first configuration for transmission of ACKs/NACKs for DL transmissions received by the UE and/or a second configuration for reception of ACKs/ NACKs for UL transmissions sent by the UE, means for receiving an indication comprising one or more resources in which the ACKs/NACKs for the received DL transmissions are to be transmitted or in which the ACKs/NACKs for sent UL transmissions are to be received, means for receiving a delay period for delaying transmission of ACKs/NACKs, means for receiving from the eNB a first transmission in a first subframe, means for receiving from the eNB a second transmission in a second subframe subsequent to the first subframe, means for sending to the eNB a first transmission in a first subframe, means for sending to the eNB a second transmission in a second subframe subsequent to the first subframe, means for receiving concurrently from the eNB a first ACK/NACK to the sent first transmission and a second ACK/NACK to the sent second transmission in a third subframe delayed from the first subframe based on the delay period, means for receiving from the eNB a first ACK/NACK to the first transmission in a third subframe delayed from the first subframe based on the delay period, means for receiving from the eNB a second ACK/NACK to the second transmission in a fourth subframe delayed from the second subframe based on the delay period, means for receiving from the eNB a combined ACK/NACK for both the first transmission and the second transmission in a third subframe delayed from the first subframe based on the delay period, means for sending concurrently to the eNB a first ACK/ NACK to the first transmission and a second ACK/NACK to the second transmission in a third subframe delayed from the first subframe based on the delay period, means for sending to the eNB a first ACK/NACK to the first transmission in a third subframe delayed from the first subframe based on the delay period, means for sending to the eNB a second ACK/NACK to the second transmission in a fourth subframe delayed from the second subframe based on the delay period, means for sending to the eNB a combined ACK/ NACK for both the first transmission and the second transmission in a third subframe delayed from the first subframe based on the delay period, means for receiving an indication of one or more of the received DL transmissions that are to be acknowledged, and means for transmitting the ACKs/ NACKs for only a subset of the received DL transmissions based on the indication of the one or more of the received DL transmissions that are to be acknowledged. The aforementioned means may be one or more of the aforementioned modules of the apparatus 1702 and/or the processing system 1814 of the apparatus 1702' configured to perform the functions recited by the aforementioned means. As described supra, the processing system 1814 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

Therefore, by scheduling ACK/NACK transmissions for a specific subset of the transmissions, the load of the ACK/ NACK transmissions in a system may be reduced. Moreover, by scheduling the ACKs/NACKS for periods when interference is low, the reliability of ACKs/NACKs may be increased.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication by a user equipment (UE), comprising:
    receiving, from a base station, a first indication associated with a first downlink transmission, the first indication comprising a first timing information for transmission of a first acknowledgment (ACK)/negative acknowledgement (NACK) to the first downlink transmission, wherein the first timing information indicates a number of time slots by which the first ACK/NACK is transmitted after the first downlink transmission, wherein the number of time slots is variable irrespective of a transmission duration of the first downlink transmission, wherein the first indication further indicates a subset of, but not all of, multiple downlink transmissions that are to be acknowledged;
    receiving, from the base station, the first downlink transmission; and
    transmitting, to the base station, the first ACK/NACK to the first downlink transmission based on the first timing information.

2. The method of claim 1, wherein the first timing information comprises a delay period for ACK/NACK transmission.

3. The method of claim 1, wherein the first timing information is indicated based on a radio resource control (RRC) configuration of one or more time slots.

4. The method of claim 1, further comprising:
    receiving a second indication comprising a second timing information for transmission of ACK/NACK;
    receiving a second downlink transmission; and
    transmitting a second ACK/NACK for the second downlink transmission in a same time slot as the first ACK/NACK, based on the first and the second timing information.

5. The method of claim 1, wherein the first indication further comprises resource information for transmission of ACK/NACK.

6. The method of claim 1, wherein the subset comprises one downlink transmission for each number of downlink transmissions in a sequence of downlink transmissions.

7. The method of claim 1, wherein the subset excludes downlink transmissions having new data.

8. A user equipment (UE), comprising:
    memory; and
    a processor coupled to the memory and configured to:
    receive, from a base station, a first indication associated with a first downlink transmission, the first indication comprising a first timing information for transmission of a first acknowledgment (ACK)/negative acknowledgement (NACK) to the first downlink transmission, wherein the first timing information indicates a number of time slots by which the first ACK/NACK is transmitted after the first downlink transmission, wherein the number of time slots is variable irrespective of a transmission duration of the first downlink transmission, wherein the first indication further indicates a subset of, but not all of, multiple downlink transmissions that are to be acknowledged;
    receive, from the base station, the first downlink transmission; and
    transmit, to the base station, the first ACK/NACK to the first downlink transmission based on the first timing information.

9. The UE of claim 8, wherein the first timing information comprises a delay period for ACK/NACK transmission.

10. The UE of claim 8, wherein the first timing information is indicated based on a radio resource control (RRC) configuration of one or more time slots.

11. The UE of claim 8, further comprising:
    receiving a second indication comprising a second timing information for transmission of ACK/NACK;
    receiving a second downlink transmission; and
    transmitting a second ACK/NACK for the second downlink transmission in a same time slot as the first ACK/NACK, based on the first and the second timing information.

12. The UE of claim 8, wherein the first indication further comprises resource information for transmission of ACK/NACK.

13. An apparatus of wireless communication of a user equipment (UE), comprising:
    means for receiving, from a base station, a first indication associated with a first downlink transmission, the first indication comprising a first timing information for transmission of a first acknowledgment (ACK)/negative acknowledgement (NACK) to the first downlink transmission, wherein the first timing information indicates a number of time slots by which the first ACK/NACK is transmitted after the first downlink transmission, wherein the number of time slots is variable irrespective of a transmission duration of the first downlink transmission, wherein the first indication further indicates a subset of, but not all of, multiple downlink transmissions that are to be acknowledged;
    means for receiving, from the base station, the first downlink transmission; and
    means for transmitting, to the base station, the first ACK/NACK to the first downlink transmission based on the first timing information.

14. The apparatus of claim 13, wherein the first timing information comprises a delay period for ACK/NACK transmission.

15. The apparatus of claim 13, wherein the first timing information is indicated based on a radio resource control (RRC) configuration of one or more time slots.

16. The apparatus of claim 13, further comprising:
    means for receiving a second indication comprising a second timing information for transmission of ACK/NACK;

means for receiving a second downlink transmission; and means for transmitting a second ACK/NACK for the second downlink transmission in a same time slot as the first ACK/NACK, based on the first and the second timing information.

17. The apparatus of claim 13, wherein the first indication further comprises resource information for transmission of ACK/NACK.

18. A method of wireless communication, comprising:

transmitting, to a user equipment (UE), a first indication associated with a first downlink transmission, the first indication comprising a first timing information for transmission of a first acknowledgment (ACK)/negative acknowledgement (NACK) to the first downlink transmission, wherein the first timing information indicates a number of time slots by which the first ACK/NACK is transmitted after the first downlink transmission, wherein the number of time slots is variable irrespective of a transmission duration of the first downlink transmission, wherein the first indication further indicates a subset of, but not all of, multiple downlink transmissions that are to be acknowledged;

transmitting, to the UE, the first downlink transmission; and receiving, from the UE, the first ACK/NACK to the first downlink transmission based on the first timing information.

19. The method of claim 18, wherein the first timing information comprises a delay period for ACK/NACK transmission.

20. The method of claim 18, wherein the first timing information is indicated based on a radio resource control (RRC) configuration of one or more time slots.

21. The method of claim 18, further comprising:

transmitting a second indication comprising a second timing information for transmission of ACK/NACK;

transmitting a second downlink transmission; and receiving a second ACK/NACK for the second downlink transmission in a same time slot as the first ACK/NACK, based on the first and the second timing information.

22. The method of claim 18, wherein the first indication further comprises resource information for transmission of ACK/NACK.

23. A base station, comprising:

memory; and a processor coupled to the memory and configured to:

transmit, to a user equipment (UE), a first indication associated with a first downlink transmission, the first indication comprising a first timing information for transmission of a first acknowledgment (ACK)/negative acknowledgement (NACK) to the first downlink transmission, wherein the first timing information indicates a number of time slots by which the first ACK/NACK is transmitted after the first downlink transmission, wherein the number of time slots is variable irrespective of a transmission duration of the first downlink transmission, wherein the first indication further indicates a subset of, but not all of, multiple downlink transmissions that are to be acknowledged;

transmit, to the UE, the first downlink transmission; and receive, from the UE, the first ACK/NACK to the first downlink transmission based on the first timing information.

24. The base station of claim 23, wherein the first timing information comprises a delay period for ACK/NACK transmission.

25. The base station of claim 23, wherein the first timing information is indicated based on a radio resource control (RRC) configuration of one or more time slots.

26. The base station of claim 23, further comprising:

transmitting a second indication comprising a second timing information for transmission of ACK/NACK;

transmitting a second downlink transmission; and receiving a second ACK/NACK for the second downlink transmission in a same time slot as the first ACK/NACK, based on the first and the second timing information.

27. The base station of claim 23, wherein the first indication further comprises resource information for transmission of ACK/NACK.

* * * * *